(12) United States Patent
Shi

(10) Patent No.: US 8,351,000 B2
(45) Date of Patent: Jan. 8, 2013

(54) OPTICAL FILM AND METHOD FOR PRODUCING SAME, POLARIZER, AND LIQUID CRYSTAL DISPLAY DEVICE

(75) Inventor: Zemin Shi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 295 days.

(21) Appl. No.: 12/894,582

(22) Filed: Sep. 30, 2010

(65) Prior Publication Data

US 2011/0234952 A1 Sep. 29, 2011

(30) Foreign Application Priority Data

Sep. 30, 2009 (JP) ................................. 2009-228741

(51) Int. Cl.
*G02F 1/1335* (2006.01)
*C09K 19/02* (2006.01)
(52) U.S. Cl. .......................... 349/118; 349/117; 349/179
(58) Field of Classification Search ........... 349/117–118
See application file for complete search history.

(56) References Cited

U.S. PATENT DOCUMENTS

| | | | |
|---|---|---|---|
| 8,040,468 B2 * | 10/2011 | Ohmuro et al. | 349/102 |
| 8,184,247 B2 * | 5/2012 | Nimura et al. | 349/119 |
| 2004/0257506 A1 * | 12/2004 | Tashiro et al. | 349/123 |
| 2006/0055856 A1 * | 3/2006 | Tashiro et al. | 349/123 |
| 2006/0061714 A1 * | 3/2006 | Tashiro et al. | 349/113 |
| 2009/0040454 A1 * | 2/2009 | Ichihashi et al. | 349/193 |
| 2010/0053511 A1 * | 3/2010 | Ohmuro et al. | 349/102 |
| 2011/0052837 A1 * | 3/2011 | Hashimoto et al. | 428/1.3 |
| 2011/0234952 A1 * | 9/2011 | Shi | 349/117 |

FOREIGN PATENT DOCUMENTS

| | | |
|---|---|---|
| JP | 06-222213 | 8/1994 |
| JP | 2003-025414 | 1/2003 |
| JP | 2007-038646 | 2/2007 |

* cited by examiner

*Primary Examiner* — Rhonda Peace
(74) *Attorney, Agent, or Firm* — Young & Thompson

(57) ABSTRACT

An optical film comprising a thermoplastic resin, which is such that the slow axis direction in the film plane differs from the film tilt direction and the birefringence of a sliced section of the film that contains the tilt direction and the thickness direction in the plane varies in the thickness direction of the film.

20 Claims, 3 Drawing Sheets

OPTICAL FILM AND METHOD FOR PRODUCING SAME, POLARIZER, AND LIQUID CRYSTAL DISPLAY DEVICE

CROSS-REFERENCE TO RELATED APPLICATIONS

The present application claims the benefit of priority from Japanese Patent Application No. 228741/2009, filed on Sep. 30, 2009, the contents of which are herein incorporated by reference in their entirety.

BACKGROUND OF THE INVENTION

1. Field of the Invention

The present invention relates to an optical film and to a method for producing it. Precisely, the invention relates to an optical film produced according to a specific production method and having a particular internal structure, and to a polarizer and a liquid crystal display device each having the optical film.

2. Description of the Related Art

With the recent prosperity of the liquid crystal display device market, various films have been developed. For example, JP-A 6-222213, 2003-25414 and 2007-38646 disclose tilted retardation films having a tilt structure.

For example, JP-A 6-222213 describes a method for producing a film of which the optical axis in the thickness direction is tilted, and the method comprises introducing a film between two rolls each running at a different peripheral speed to thereby impart a shearing force to the film, and stretching the film in the lateral direction (in the direction perpendicular to the film traveling direction) in a high temperature atmosphere; and the reference also describes application of the film to a TN-mode liquid crystal display device. However, the reference does not suggest impartation of a shearing force to a melt, but describes only impartation of a shearing force to a solid film. The method of imparting a shearing force to a solid film is problematic in point of the uniformity of the optical properties of the obtained optical film.

JP-A 2003-25414 and 2007-38646 describe a method comprising sandwiching a molten material between two rolls of a rubber roll and a metal roll of which the peripheral speed may differ from that of the rubber roll, thereby imparting a shearing force thereto to produce a film of which the optical axis in the thickness direction is tilted. JP-A 2003-25414 and 2007-38646 describe or suggest the applicability of the optical film described therein to a TN-mode liquid crystal display device. On the other hand, though these references say that it is preferable to stretch an optical film having a tilt structure, they disclose only examples of an embodiment of stretching a film in the machine direction (film traveling direction), or that is, no detailed investigation is made therein relating to the internal structure of an optical film obtained by stretching a film having a tilt structure in the machine direction.

On the other hand, regarding the alignment of the liquid crystal molecules in the liquid crystal cell in a TN-mode liquid crystal display device, it is known that the liquid crystal molecules are tilted in the thickness direction between electrodes and the alignment of the liquid crystal molecules changes continuously in some degree toward the thickness direction from one end to the other end of the liquid crystal cell. Assiduous studies have been made for the purpose of obtaining an optical film capable of optically compensating only the liquid crystal molecules thus aligned in that manner; however, the details of the internal structure of the obtained optical film are not disclosed in any references including the above-mentioned JP-A 6-222213, 2003-25414 and 2007-38646, and in fact, any detailed investigations relating to this have not been made as yet.

SUMMARY OF THE INVENTION

The present inventors produced an optical film and laterally stretched it according to the method described in JP-A 6-222213, and incorporated the produced film in a TN-mode liquid crystal display device and tested the device, and as a result, the inventors have known that the viewing angle compensation in the device could not reach the level capable of satisfying the requirement needed in the art these days, and in addition, the device involves a problem of peripheral unevenness caused by light leakage (that is, frame-like display unevenness spreading from the periphery of the display panel) in watching the panel in oblique directions at the time of black level of display.

Further, the present inventors produced an optical film and longitudinally stretched it according to the method described in JP-A 2003-25414 and 2007-38646, and incorporated the produced film in a TN-mode liquid crystal display device and tested the device, and as a result, the inventors have known that the optical properties of the optical film could surely be uniformized as a whole but the problem of peripheral unevenness mentioned above could not be solved as yet but still kept remaining as such. In addition, the viewing angle compensation capability of the film when used in a TN-mode liquid crystal display device is still on an unsatisfactory level like that in the above-mentioned JP-A 6-222213.

As described in the above, when used in a TN-mode liquid crystal display device, the conventional tilt structure-having optical film could not realize sufficient optical compensation from the viewpoint of the viewing angle compensation capability thereof and of the ability thereof to solve the problem of peripheral unevenness. No method has heretofore been known capable of producing an optical film that has a sufficient capability for optical compensation in TN-mode liquid crystal display devices. In addition, at present, no investigations have been made relating to a production method of such an optical film and the internal structure of the optical film produced according to the production method. Accordingly, it is very much a situation in which even the improving direction for the production method for optical films suitable for TN-mode liquid crystal display devices is not as yet established.

The present invention has been made in consideration of the above-mentioned problems, and a first object of the invention is to provide an optical film having a particular internal structure and capable of realizing sufficient optical compensation when used in a TN-mode liquid crystal display device, and to provide a method for producing the optical film. A second object of the invention is to provide a polarizer, an optical compensatory film and a liquid crystal display device comprising the optical film.

Relative to the above-mentioned problems, the present inventors have made detailed investigations of the internal structure of the optical film produced according to the conventional method, relating to the relationship between the slow axis direction and the tilt structure of the film and to the level of the birefringence in the thickness direction of the film, and as a result, have known that the alignment structure of thermoplastic molecules of the film differs from the structure of the film needed for a TN-mode liquid crystal display device.

Given the situation, the inventors have investigated a method for producing a film having a tilt structure by leading a thermoplastic resin-containing composition to pass between a first nip-pressing surface and a second nip-pressing surface of a nip-pressing unit, thereby continuously nip-pressing it therebetween to form a film, wherein a melt of the thermoplastic resin-containing composition is nip-pressed and the thus nip-pressed film is laterally stretched, and have surprisingly found that a film having a particular internal structure differing from that of a conventional film heretofore known in the art can be produced. However, when the film having such a particular internal structure is incorporated in a TN-mode liquid crystal display device, then surely the viewing angle compensation could be partly improved and the peripheral unevenness could be partly removed, but the level of the film is still far from that required these days in the art.

Based on these findings, the present inventors have further made assiduous studies about the relationship between the lateral stretching step in the film production method and the change in the internal structure of the produced film and, as a result, have found that, when the film is laterally stretched at a temperature falling within an ordinary temperature range heretofore known in the art (for example, in JP-A 6-222213, the film is laterally stretched at 160° C. that is much higher than the glass transition temperature (hereinafter this is referred to as Tg) of the thermoplastic resin used for the film; and in Example 2 in JP-A 2006-301169, the film is laterally stretched at Tg+21° C.), then the internal structure of the obtained film suitable to a TN-mode liquid crystal display device changes. Concretely, the inventors have found that the tilt structure itself of the film is lost and even the birefringence itself thereof is also lost by the lateral stretching. Accordingly, the inventors tried lowering the stretching temperature greatly from the lateral stretching temperature range heretofore conventionally employed in the field of production of optical films and, as a result, have found a method for producing a film having a particular internal structure and, when incorporated in a TN-mode liquid crystal display device, capable of improving viewing angle compensation therein and capable of solving the problem of peripheral unevenness of the display panel therein.

Specifically, the inventors have assiduously investigated for the purpose of solving the above-mentioned problems and, as a result, have found that the production method mentioned below and the optical film produced according to the method can solve the above-mentioned problems, and have completed the present invention described below.

[1] An optical film comprising a thermoplastic resin, which is such that the slow axis direction in the film plane differs from the film tilt direction and the birefringence of a sliced section of the film that contains the tilt direction and the thickness direction in the plane varies in the thickness direction of the film.

[2] The optical film of [1], which is such that the angle between the slow axis direction in the film plane and the film tilt direction is within a range of from 89° to 91°.

[3] The optical film of [1] of [2], which is such that, when the sliced section of the film is analyzed sequentially from one end to the other end in the thickness direction of the film, then the part having a largest birefringence exists in the region of from 10% to 90% length from one side in the thickness direction of the film.

[4] The optical film of any one of [1] to [3], which is such that, when the sliced section of the film is placed between two polarizers set in a crossed Nicols configuration, and when the sliced section is rotated within a range of from 0° to 90° while irradiated with light in the direction perpendicular to the polarizer plane, then the detected extinction position varies depending on the distance from one end of the sliced section in the thickness direction of the film, and plural extinction positions are detected at different angles within a range of from 1° to 90°.

[5] The optical film of [4], which is such that, when the sliced section of the film is analyzed sequentially from one end to the other end in the thickness direction thereof, then the difference between the maximum extinction position and the minimum extinction position is more than 5°.

[6] The optical film of any one of [1] to [5], which satisfies the following formulae (I) and (II) wherein Re[0°] means the retardation measured in the normal direction of the film at a wavelength of 550 nm, Re[+40°] means the retardation measured in the direction tilted by 40° from the normal line to the tilt direction and Re[−40°] means the retardation measured in the direction tilted by −40° from the normal line to the tilt direction:

$$20nm \leq Re[0°] \leq 300nm \quad (I)$$

$$10nm \leq \gamma \leq 300nm \quad (II)$$

$$\gamma = |Re[+40°] - Re[-40°]| \quad (III)$$

[7] The optical film of [6], which satisfies the following formula (II') wherein Re[+40°] means the retardation measured in the direction tilted by 40° from the normal line of the film to the tilt direction and Re[−40°] means the retardation measured in the direction tilted by −40° from the normal line to the tilt direction:

$$20nm \leq \gamma \leq 210nm \quad (II')$$

$$\gamma = |Re[+40°] - Re[-40°]| \quad (III)$$

[8] The optical film of any one of [1] to [7], wherein the thermoplastic resin is at least one selected from cyclic olefin resins, cellulose acylate resins, polycarbonate resins, polyolefin resins, acrylic resins and styrenic resins.

[9] A method for producing an optical film comprising leading a melt of a composition containing a thermoplastic resin to pass between a first nip-pressing surface and a second nip-pressing surface of a nip-pressing unit, thereby continuously nip-pressing it therebetween to form a nip-pressed film, and stretching the nip-pressed film in the direction differing from the film traveling direction with holding both sides of the film (hereinafter this step may be referred to as a lateral stretching step), wherein the moving speed of the first nip-pressing surface is higher than the moving speed of the second nip-pressing surface and the stretching is attained at a temperature falling within a range of from (Tg−40)° C. to (Tg+5)° C. and wherein Tg means the glass transition temperature of the thermoplastic resin.

[10] The method for producing an optical film of [9], wherein the ratio of Re[0°] of the side of the nip-pressed film to Re[0°] of the center of the film falls within a range of from 0.5 to 0.99.

[11] The method for producing an optical film of [9] or [10], wherein a pressure of from 20 to 500 MPa is given to the melt by the nip-pressing unit.

[12] The method for producing an optical film of any one of [9] to [11], wherein the ratio of the moving speed of the second nip-pressing surface to that of the first nip-pressing surface of the nip-pressing unit, as defined according to the following formula (IV), is from 0.60 to 0.99:

Moving speed ratio=(speed of second nip-pressing surface)/(speed of first nip-pressing surface)  (IV).

[13] The method for producing an optical film of any one of [9] to [12], wherein the nip-pressed film is stretched in the direction of 90°±1° relative to the film traveling direction.

[14] The method for producing an optical film of any one of [9] to [13], which includes preheating the nip-pressed film at (Tg−40)° C. to (Tg+3)° C.

[15] An optical film produced according to the optical film production method of any one of [9] to [14].

[16] A polarizer comprising at least one optical film of any one of [1] to [8] and [15].

[17] An optical compensatory film comprising at least one optical film of any one of [1] to [8] and [15].

[18] A liquid crystal display device comprising at least one optical film of any one of [1] to [8] and [15].

According to the invention, there are provided an optical film capable of realizing good optical compensation when used in TN-mode liquid crystal display devices, and a method for producing the film. Heretofore, in ECB-mode liquid crystal display devices and TN-mode liquid crystal display devices, an optical compensatory film having an optical compensatory layer of a liquid crystal composition is laminated on a polarizing element. For example, NH film (by Nippon Oil Corporation) and WV film (by FUJIFILM) are known. According to the invention, there are provided a simpler film not requiring an optical compensatory layer of a liquid crystal composition, and a method for producing the film.

Figure 1:
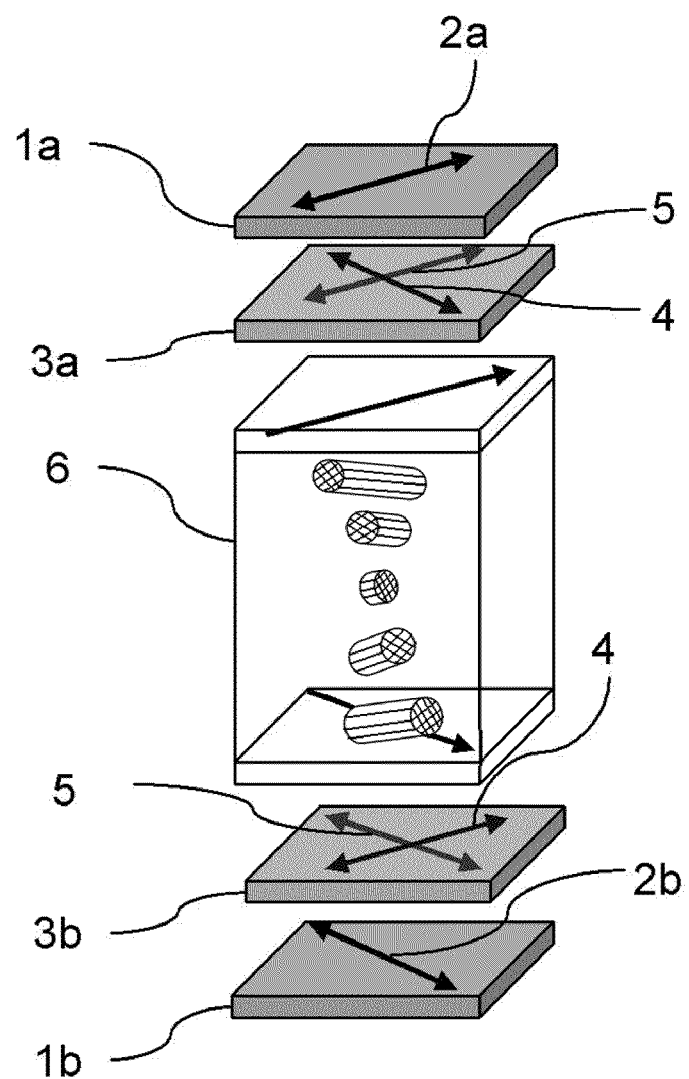
FIG. 1 is a schematic view showing the absorption axis of the polarizer, the alignment direction of the liquid crystal cell and the slow axis of the film in a TN-mode liquid crystal display device of the invention.

In the drawings, 1a and 1b each are a polarizing element, 2a is the absorption axis of the polarizing element, 2b is the absorption axis (machine direction, MD) of the polarizing element, 3a and 3b each are a polarizer protective film of Example, 4 is the in-plane slow axis direction (transverse direction, TD) of the film of Example, 5 is the tilt direction (MD) of the film of Example, 6 is a liquid crystal cell, 7 is a touch side, and 8 is a chilled side.

BEST MODE FOR CARRYING OUT THE INVENTION

The invention is described in more detail hereinunder. In this description, the numerical range expressed by the wording "a number to another number" means the range that falls between the former number indicating the lowermost limit of the range and the latter number indicating the uppermost limit thereof. In this description, the "lengthwise direction of the film" means the machine direction (MD), or that is, the film traveling direction. In the invention, "composition containing a thermoplastic resin" and "film comprising a thermoplastic resin" mean that the composition and the film each contain a thermoplastic resin capable of being formed into a film by melt casting, in an amount of at least 50%. In this description, the magnitude of the tilt structure (of retardation) means |Re[+40°]−Re[−40°]|(=γ) to be mentioned below. In this description, the optical film having a tilt structure means that γ of the optical film is not zero. In this description, "lateral stretching" means a step of stretching a film in the direction differing from the film traveling direction, and is not limited to a step of stretching a film in the direction perpendicular to the film traveling direction.

[Optical Film]

The optical film of the invention (hereinafter this may be referred to as the film of the invention) comprises a thermoplastic resin and is such that the slow axis direction in the film plane differs from the film tilt direction and the birefringence of a sliced section of the film that contains the tilt direction and the thickness direction in the plane varies in the thickness direction thereof. The film of the invention is described below. The film of the invention is favorably used in TN-mode liquid crystal display devices, but is also favorably used in other modes of liquid crystal display devices having an internal structure similar to that of TN-mode devices.

(Birefringence Change in Thickness Direction)

The film of the invention is such that the birefringence of the sliced section of the film that contains the tilt direction and the thickness direction in the plane thereof varies in the thickness direction of the film. Specifically, in a liquid crystal display panel (LCD), liquid crystal molecules are aligned between two electrodes, and the light given to the device is blocked by the molecules or is led to pass through them for image display. In that manner, the liquid crystal molecules are tilted between electrodes and the alignment of the liquid crystal molecules changes, and therefore for compensating this, use of a film of which the birefringence varies in the thickness direction thereof is effective. In particular, for such delicate compensation, all the liquid crystal molecules in LCD must be compensated. Regarding the internal structure of the film of the invention in this connection, the birefringence of the film varies in the thickness direction thereof, and therefore, the film can favorably compensate and remove "peripheral unevenness" when incorporated in a TN-mode liquid crystal display device.

(Angle Between Slow-Axis Direction and Tilt Direction)

In the film plane of the invention, the slow axis direction differs from the film tilt direction. The present inventors have found that, as having such a particular internal structure, the film of the invention can realize viewing angle enlargement in a TN-mode liquid crystal display device.

Preferably, in the invention, the angle between the slow axis direction and the tilt direction of the optical compensatory film is from 30° to 150°, more preferably from 44° to 136°, even more preferably from 89° to 91° from the viewpoint of simplifying the lateral stretching apparatus for use in the invention and from the viewpoint of preventing axial misalignment in the invention. In case where the film is used in a TN-mode device, in particular, the angle is preferably 90°. Using the optical compensatory film of the type realizes both compensation of a polarizer and alignment compensation of liquid crystal molecules in a liquid crystal cell.

(Position of Maximum Birefringence)

Preferably, the film of the invention is such that, when the sliced section of the film is analyzed sequentially from one end to the other end in the thickness direction thereof, then the part having a largest birefringence exists in the range of from 10% to 90% in the thickness direction thereof, from the viewpoint of removing the peripheral unevenness of the device when the film is incorporated in a liquid crystal display device and from the viewpoint of reducing the temporal change rate of γ. In the invention, preferably, the maximum birefringence of the sliced section of the film that contains the tilt direction and the thickness direction in the plane of the film is within a range of from 15% to 85% of the section in the thickness direction, more preferably from 20% to 80%. When the maximum birefringence exists inside the film in the thickness direction thereof, the temporal stability of the optical properties of the film relative to heat and stress can be good. In this description, for convenience sake, the side of the film kept in contact with the nip-pressing surface on the side having a higher moving speed in the optical film production method of the invention to be mentioned below is taken as the standard side in measuring the distance in the thickness direction of the film. In other words, the level of the position of the surface of the film kept in contact with the nip-pressing surface moving at a higher moving speed is 0%, and the level of the position of the other end of the film is 100%.

(Magnitude of Birefringence)

Preferably, the birefringence of the sliced section of the film is from 0 to 0.05, more preferably from 0.001 to 0.048, even more preferably from 0.002 to 0.045.

Preferably, the difference between the maximum birefringence and the minimum birefringence of the sliced section of the film is from 0.0005 to 0.05, more preferably from 0.001 to 0.04, even more preferably from 0.002 to 0.04.

(Extinction Position)

The optical film of the invention is preferably such that, when the sliced section of the film is placed between two polarizers set in a crossed Nicols configuration, and when the sliced section is rotated within a range of from 0° to 90° while irradiated with light in the direction perpendicular to the polarizer plane, then the detected extinction position varies depending on the distance from one end of the sliced section of the film in the thickness direction thereof, and plural extinction positions are detected at different angles within a range of from 1° to 90°, from the viewpoint that the optical film of the type can more effectively enlarge the viewing angle when incorporated in a TN-mode liquid crystal display device. The extinction position change means molecular alignment angle change. In this description, the extinction position means, when the sliced section of the film is rotated within a range of from 0° to 90° under a crossed Nicols configuration and when its brightness change is detected, the angle at which the sliced section of the film is the darkest.

Preferably, the film of the invention has plural extinction positions detected at different angles within a range of from 5° to less than 90° in the thickness direction from one end of the sliced section of the film, more preferably, has plural extinction positions detected at different angles within a range of from 5° to less than 85°.

The optical film of the invention is preferably such that, when the sliced section of the film is, as placed between two polarizers set in a crossed Nicols configuration, rotated within a range of from 0° to 90° and when it is analyzed sequentially from one end to the other end in the thickness direction thereof, then the first detected extinction position differs from the last detected extinction position by more than 5°, from the viewpoint of its effect of more efficiently enlarging the viewing angle when the film is incorporated in a TN-mode liquid crystal display device, more preferably by more than 10°.

Also preferably, the extinction position of the film of the invention, as analyzed under the above-mentioned condition, rapidly varies relative to the distance in the thickness direction thereof. For example, preferably, the extinction position varies by at least 0.2° per μm of the film thickness, more preferably by at least 1° per μm of the film thickness, even more preferably by at least 5° per μm of the film thickness.

In the film of the invention, the extinction position varies in the part of the sliced section of the film where the birefringence is substantially not 0 (zero), and therefore, the film exhibit excellent viewing angle compensation capability when used in a liquid crystal display device. In this description, the part where the birefringence is substantially not 0 means that, when a sliced section of the film of the invention is analyzed with a polarization microscope and when the birefringence thereof is measured with reference to an interference color chart, the degree of alignment of the film of the intended part is at least $2 \times 10^{-5}$.

Concretely, the extinction position of the film of the invention can be determined, for example, according to the following method:

(1) A film is sampled to give a piece of 5 mm (parallel to the tilt direction)×10 mm (perpendicular to the tilt direction).

(2) The sample film is smoothed with a microtome (Leica's RM2265) on one side of the surface parallel to the tilt direction thereof.

(3) This is cut with a razor (Nisshin EM's single-edge trimming razor), on the surface spaced by 500 μm in the direction perpendicular to the tilt direction from the smoothed surface, in parallel to the tilt direction, thereby preparing a sliced section of the film containing both the tilt direction and the thickness direction in the film plane.

(4) The sliced section of the film is put between two polarizers positioned in a crossed Nicols configuration, and analyzed by visual check with a polarization microscope (Nikon's Eclipse E600POL) for the extinction change (darkest under crossed Nicols) in plural regions of the film divided equally in the film thickness direction. Concretely, the sliced section of the film is disposed in parallel to the two polarizers, then the two polarizers are set and fixed under crossed Nicols, and the two crossed Nicols polarizers are rotated at desired intervals (for example, at intervals of 1°) within a range of from 0° to 90° with checking for the extinction change in the sliced film.

The light source in the polarization microscope analysis is not specifically defined, but is preferably a white light source. The extinction position determination is not specifically defined so far as it is attained under crossed Nicols. Preferably, based on the images taken with the polarization microscope under crossed Nicols, the extinction position is determined. The sliced film is disposed in parallel to the absorption axis-containing plane of each of the two polarizers.

The actual polarization microscope images do not have a definite multilayer constitution, but have continuous layers formed in the film. Since the layer constitution could not be analyzed over the resolution power of the microscope used, in the invention, the extinction change in the thickness direction of the film detected in the above (1) to (4) may be determined in the manner of the following (i) and (ii).

(i) Polarization microscope images taken at intervals of 1° within a range of from 0° to 90° are divided into 20 in the thickness direction (for example, into 5 μm pieces from a 100-μm thick film), and these are separated into layers sequentially from the surface of one side.

(ii) The images taken within a range of from 0° to 90° are analyzed for the brightness change in every layer, and within the range of from 0° to 90°, the angle at which the image is the darkest is taken as the extinction position.

(In-Plane Retardation Re)

Preferably, the film of the invention satisfies the following formulae (I) and (II), wherein Re[0°] means the retardation measured in the normal direction of the film at a wavelength of 550 nm, Re[+40°] means the retardation measured in the direction tilted by 40° from the normal line to the tilt direction, and Re[−40°] means the retardation measured in the direction tilted by −40° from the normal line to the tilt direction:

$$20 \text{ nm} \leq Re[0°] \leq 300 \text{ nm} \quad \text{(I)}$$

$$10 \text{ nm} \leq \gamma \leq 300 \text{ nm} \quad \text{(II)}$$

$$\gamma = |Re[+40°] - Re[-40°]| \quad \text{(III)}$$

In this description, "direction tilted by θ° from the film normal line" is defined as the direction tilted in the film plane direction by θ° as the tilt direction from the normal direction. Specifically, the normal direction of the film plane is the direction in which the tilt angle is 0°, and a direction in the film plane is the direction in which the tilt angle is 90° in case where the positivity or the negativity of the sign of the tilt angle (θ) is not taken into consideration. On the other hand, in case where the positivity or the negativity of the sign of the tilt angle (θ) is taken into consideration, the direction in which Re[+40°] is measured and the direction in which Re[−40°] is measured is in linear symmetry relative to the film normal line.

The in-plane retardation Re[0°] of the film of the invention is from 20 to 300 nm, preferably from 60 to 300 nm, more preferably from 60 to 250 nm, even more preferably from 60 to 200 nm, still more preferably from 80 to 180 nm.

Preferably, γ of the film of the invention satisfies the following formula (II') from the viewpoint that the film may more effectively enlarge the viewing angle when incorporated in a TN-mode liquid crystal display device.

$$10 \text{ nm} \leq \gamma \leq 210 \text{ nm} \quad \text{(II')}$$

More preferably, γ is from 50 to 210 nm, even more preferably from 60 to 200 nm, still more preferably from 80 to 180 nm.

The film of the invention of which γ and Re[0°] each fall within the above-mentioned preferred range can be produced according to the production method of the invention to be mentioned below. In case where the optical film having the preferred optical properties is used for optical compensation in TN-mode, ECB-mode, OCB-mode or the like liquid crystal display devices, it contributes toward improving the viewing angle characteristics of the devices and realizes wide viewing angle display devices.

Preferably, the thickness of the film of the invention is at most 200 μm, more preferably at most 100 μm. In case where the film is used in liquid crystal display devices and the like, its thickness is preferably at most 80 μm from the viewpoint of further thinning the display devices, more preferably at most 60 μm, even more preferably at most 40 μm. According to the film production method of the invention, such thin films can be produced and this is one characteristic feature of the invention differing from the related prior art.

Preferably, the thickness-direction retardation Rth of the film of the invention satisfies the following formula (V):

$$40 \text{ nm} \leq Rth \leq 500 \text{ nm} \quad \text{(V)}$$

$$Rth = ((nx + ny)/2 - nz) \times d \quad \text{(V)'}$$

wherein nx, ny and nz each mean the refractive index in the respective main axis direction of an index ellipsoid, and d means the film thickness.

More preferably, the thickness-direction retardation Rth of the film of the invention is from 40 to 350 nm, even more preferably from 40 to 300 nm.

The fluctuation of Re[0°], Re[+40°] and Re[−40°] of the film causes display unevenness when the film is used in a liquid crystal display device, and therefore the fluctuation is preferably as small as possible. Concretely, the fluctuation is preferably within ±3 nm, more preferably within ±1 nm. Similarly, the slow axis angle fluctuation also causes display unevenness, and therefore the fluctuation is preferably as small as possible. Concretely, the fluctuation is preferably within ±1°, more preferably within ±0.5°, even more preferably within ±0.25°.

In this description, Re[θ] and Rth each indicate the in-plane retardation (nm) and the thickness-direction retardation (nm), respectively, of the analyzed filmy object such as optical anisotropic layer, film, laminate, etc.

Re[0°] is measured using KOBRA 21ADH or WR (by Oji Scientific Instruments), by applying a light having a wavelength of 550 nm to a filmy object to be analyzed, in the normal line direction of the object. In selecting the measurement wavelength λ nm, the wavelength selection filter may be exchanged manually, or the found data may be computed through programming or the like.

In case where the filmy object to be analyzed is a monoaxial or biaxial index ellipsoid, its Rth may be computed according to the method mentioned below.

Concretely, Rth is measured as follows: Based on the in-plane slow axis (determined by KOBRA 21ADH or WR) taken as the tilt axis (rotation axis) of the filmy object to be analyzed (in case where the filmy object does not have a slow axis, any in-plane direction thereof may be taken as the rotation axis), a light at a wavelength of 550 nm is given to the filmy object in the direction tilted from the normal direction thereof within a range of from −50° to +50° at intervals of 10 degrees, and the retardation value of the filmy object is measured in the tilted direction at 11 points in total; and from the thus-found retardation data, the assumptive value of the mean refractive index and the inputted film thickness, KOBRA 21ADH or WR computes Rth of the analyzed filmy object.

In the above, when the filmy object to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth of the filmy object is calculated by KOBRA 21ADH or WR.

Around the slow axis as the rotation angle of the filmy object (when the filmy object does not have a slow axis, then its rotation axis may be in any in-plane direction of the filmy object), the retardation values are measured in any desired inclined two directions, and based on the data, and the estimated value of the mean refractive index and the inputted film thickness value, Rth may be calculated according to the following formulae (A) and (B):

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{(A)}$$

$$Rth = \left(\frac{nx + ny}{2} - nz\right) \times d \qquad (B)$$

In the above formula, Re(θ) represents a retardation value in the direction inclined by an angle θ from the normal direction.

In the formula (A), nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the filmy object to be analyzed is not expressed by a uniaxial or biaxial index ellipsoid, or that is, when the filmy object does not have an optical axis, then Rth of the filmy object is calculated as follows.

Re of the filmy object is measured around an arbitrary in-plane direction (which may be input into KOBRA 21ADH or WR) as the in-plane inclination axis (rotation axis), relative to the normal direction of the filmy object from −50 degrees up to +50 degrees at intervals of 10 degrees, in 11 points in all with a light having a wavelength of 550 nm applied in the inclined direction; and based on the thus-measured retardation values, the estimated value of the mean refractive index and the inputted film thickness value, Rth of the filmy object can be calculated by KOBRA 21ADH or WR.

In this case, as the estimated value of the mean refractive index, values in Polymer Handbook (by John Wiley & Sons, Inc.) or those in polymer film catalogues may be used. Materials of which the mean refractive index is unknown may be analyzed with an Abbe's refractiometer to determine their data. The mean refractive index values of typical optically compensatory films are as follows: cellulose acylate (1.48), cyclo-olefin polymer (1.52), polycarbonate (1.59), polymethyl methacrylate (1.49), polystyrene (1.59). KOBRA 21ADH or WR calculates nx, ny and nz, upon enter of the estimated values of these mean refractive indices and the film thickness. Base on thus-calculated nx, ny and nz, Nz=(nx−nz)/(nx−ny) is further calculated.

Unless otherwise specifically indicated, wavelength for measurement of Re[θ] and refractive index is 550 nm.

In this description, Re[0°], Re[+40°] and Re[−40°] of the film means the retardation value measured in the film normal direction (at a tilt angle of 0°) at a wavelength of 550 nm, the retardation value measured in the direction tilted by 40° toward the tilt direction or the temporary tilt direction from the normal line (at a tilt angle of 40 degrees), and the retardation value measured in the direction tilted by −40° toward the tilt direction or the temporary tilt direction from the normal line (at a tilt angle of −40 degrees), respectively.

The tilt direction is determined according to the method mentioned below.

(1) The slow axis direction in the film plane is taken as 0°, and the fast axis direction in the film plane is taken as 90°. A temporary tilt direction is set at intervals of 0.1° between 0° and 90°.

(2) Re[+40°] and Re[−40°] are measured in the directions tilted by 40° or −40° from the normal line of the film to each temporary tilt direction, and |Re[+40°]−Re[−40°]| in each temporary tilt direction is computed.

(3) The direction in which the |Re[+40°]−Re[−40°]| is the largest is taken as the tilt direction.

In this description, "having a tilt direction" means existing a direction where the |Re[+40°]−Re[−40°]| is the largest.

In this description, Rth of the film is computed with KOBRA 21ADH or WR in the tilt direction taken as the inclination axis (rotation axis) of the film.

The fluctuation in Re[0°], Re[+40°] and Re[−40°] may be determined as follows. Ten points are randomly sampled in the center part of the film, as spaced from each other by at least 2 mm, and Re[0°], Re[+40°] and Re[−40°] are measured at the sampled sites according to the method mentioned in the above. The difference between the maximum value and the minimum value is taken as the fluctuation in Re[0°], Re[+40°] and Re[−40°] of the film. In the invention, the average of the data at those ten sites is taken as Re[0°], Re[+40°] and Re[−40°].

The fluctuation in the slow axis and the Rth to be mentioned below may be determined similarly to the above.

(Temporal Change Rate of γ)

Preferably, the temporal change rate γ of the film of the invention is small from the viewpoint that, when the film is incorporated in a TN-mode liquid crystal display device, it is effective over time for preventing the viewing angle from being narrowed and for preventing the peripheral unevenness from increasing. In this description, the temporal change rate of γ is determined through measurement and computation according to the method mentioned below. The produced film is kept in an environment at 40° C. and at a relative humidity of 90% for 500 hours, and its γ is measured before and after the storage; and the temporal change rate of γ is computed according to the following formula:

(Temporal Change Rate of γ)=100%×(absolute value of the difference of γ before and after storage)/(γ before storage).

Preferably, the temporal change rate of γ is less than 30%, more preferably less than 20%, even more preferably less than 15%, still more preferably less than 10%.

(Curl)

Preferably, the film of the invention curls little from the viewpoint that, when the film is incorporated in a TN-mode liquid crystal display device, it is effective for preventing the peripheral unevenness of the device. In particular, the film of the invention is laterally stretched when produced, and the laterally-stretched film generally tends to curl. In a preferred embodiment of the invention, the Re distribution of the nip-pressed film in the cross direction is controlled whereby even the film produced through lateral stretching can be made to curl little. Preferably, the curl of the film of the invention is less than 30 m$^{-1}$, more preferably at most 10 m$^{-1}$.

(Thermoplastic Resin)

The thermoplastic resin for use in the invention is not specifically defined so far as it has the above-mentioned optical properties, but preferably, the glass transition temperature (hereinafter this may be referred to as Tg) of the thermoplastic resin is from −30 to 230° C., more preferably from 50 to 200° C., even more preferably from 60 to 170° C.

The glass transition temperature of the thermoplastic resin may be measured as follows: Using a scanning differential calorimeter (DSC), the resin is put in a sample pan, and heated from 30° C. up to 300° C. in a nitrogen current atmosphere at 10° C./min (1st run), then cooled down to 30° C. at −10° C./min and again heated from 30° C. up to 300° C. at 10° C./min (2nd run). In the 2nd run, the temperature at which the base line begins to deviate from the low temperature side is read as the glass transition temperature (Tg) of the resin.

Preferably, the thermal decomposition temperature (Td) of the thermoplastic resin is not lower than 300° C., more preferably not lower than 260° C., even more preferably not lower than 220° C.

Preferably, the birefringence relaxation time at Tg to (Tg+100)° C. of the thermoplastic resin is at least 0.5 seconds, more preferably at least 1 second, even more preferably at least 2 seconds.

Preferably, the refractive index of the thermoplastic resin is from 1.35 to 1.77, more preferably from 1.40 to 1.65, even more preferably from 1.45 to 1.60.

Preferably, the number of the impurities having a diameter of 50 μm or more in the thermoplastic resin is at most 200/cm$^2$, more preferably at most 100/cm$^2$, even more preferably at most 50/cm$^2$.

In case where the film is produced according to a melt extrusion method, preferably, the thermoplastic resin for the film satisfies Tm<Td where Tm means the melting point of the resin and Td means the thermal decomposition temperature thereof. More preferably, a material having good shapability through melt extrusion is used for the film. From this viewpoint, for the film, preferably selected are cyclic olefin resins, cellulose acylate resins, polycarbonate resins, polyesters, polyolefins such as transparent polyethylene and transparent polypropylene, polyarylates, polysulfones, polyether sulfones, maleimide copolymers, transparent nylons, transparent fluororesins, transparent phenoxy resins, polyether imides, polystyrenes, acrylic resin, and styrenic resins. The film may contain one type of such resins, or may contain two or more different types of such resins.

Preferably, the film of the invention contains at least one selected from cyclic olefin resins, polycarbonate resins, cellulose acylate resins, polyolefin resins, acrylic resins and styrenic resins. Preferably, the cyclic olefin resins for use here are ones produced through addition polymerization.

In particular, cellulose acylate resins, cyclic olefin resins and polycarbonate resins having a positive intrinsic birefringence are preferred, because, when shear deformation is given thereto between two rolls, they may form a film in which the slow axis is in the tilt direction and which satisfies γ>0. For example, when two rolls are disposed in parallel to the die outlet port, the tilt direction is the same as the lengthwise direction of the film (film conveying direction, or that is, MD (machine direction).

When acrylic resins or styrenic resins having a negative intrinsic birefringence are processed as in the above, then the fast axis of the formed film is in the tilt direction and the film may satisfy γ>0.

In case where the film of the invention is used in liquid crystal display devices as a viewing angle compensation film therein, then the above-mentioned, positive or negative birefringence-having resins may be suitably selected and used in consideration of the characteristics of the liquid crystal display devices and of the workability of polarizers.

Examples of the cyclic olefin resins usable in the invention include norbornene resins to be obtained through polymerization of norbornene compounds. The resins may be produced according to any polymerization method of ring-opening polymerization or addition polymerization.

Addition polymerization and cyclic olefin resins obtained by it are described, for example, in Japanese Patents 3517471, 3559360, 3867178, 3871721, 3907908, 3945598, JP-T 2005-527696, JP-A 2006-28993, 2006-11361, WO2006/004376, WO2006/030797. Especially preferred are those described in Japanese Patent 3517471.

Ring-opening polymerization and cyclic olefin resins obtained by it are described, for example, in WO98/14499, Japanese Patents 3060532, 3220478, 3273046, 3404027, 3428176, 3687231, 3873934, 3912159. Especially preferred are those described in WO98/14499 and Japanese Patent 3060532.

Of such cyclic olefin resins, more preferred are those to be produced through addition polymerization from the viewpoint of the birefringence expressibility and the melt viscosity thereof; and for example, "TOPAS #6013" (by Polyplastics) can be used.

Examples of cellulose acylate resins usable in the invention include cellulose acylates where at least a part of three hydroxyl groups in the cellulose unit are substituted with an acyl group. The acyl group (preferably acyl group having from 3 to 22 carbon atoms) may be any of an aliphatic acyl group or an aromatic acyl group. In particular, preferred are cellulose acylates having an aliphatic acyl group, more preferably an aliphatic acyl group having from 3 to 7 carbon atoms, even more preferably an aliphatic acyl group having from 3 to 6 carbon atoms, still more preferably an aliphatic acyl group having from 3 to 5 carbon atoms. One molecule of the resin may have two or more different types of acyl groups. Preferred examples of the acyl group include an acetyl group, a propionyl group, a butyryl group, a pentanoyl group, a hexanoyl group, etc. Of those, more preferred are cellulose acylates having one or more selected from an acetyl group, a propionyl group and a butyryl group; even more preferred are cellulose acylates having both an acetyl group and a propionyl group (CAP). CAP is preferred since its production is easy and since its extrusion stability is good.

In case where the film of the invention is produced according to a melt extrusion method including the production method of the invention, the cellulose acylate to be used preferably satisfies the following formulae (S-1) and (S-2). The cellulose acylate satisfying the following formulae has a low melting temperature and is improved in point of the melting behavior thereof, and is therefore excellent in the melt extrusion film formation.

$$2.0 \leq X+Y \leq 3.0, \quad (S\text{-}1)$$

$$0.25 \leq Y \leq 3.0. \quad (S\text{-}2)$$

In the formulae (S-1) and (S-2), X means the degree of substitution with acetyl group of the hydroxyl group in cellulose; Y means the degree of substitution with acyl group having at least 3 carbon atoms of the hydroxyl group in cellulose. "Degree of substitution" as referred to herein means the ratio of substitution of the hydrogen atom of the 2-, 3- and 6-position hydroxyl groups in cellulose. In case where the hydrogen atom of all the 2-, 3- and 6-position hydroxyl groups is substituted with an acyl group, the degree of substitution is 3.

More preferably, the cellulose acylate for use in the invention satisfies the following formulae (S-3) and (S-4):

$$2.3 \leq X+Y \leq 2.95, \quad (S\text{-}3)$$

$$1.0 \leq Y \leq 2.95. \quad (S\text{-}4)$$

Even more preferably, the cellulose acylate satisfies the following formulae (S-5) and (S-6):

$$2.7 \leq X+Y \leq 2.95, \quad (S\text{-}5)$$

$$2.0 \leq Y \leq 2.9. \quad (S\text{-}6)$$

The mass-average degree of polymerization and the number-average molecular weight of the cellulose acylate resin are not specifically defined. In general, the mass-average degree of polymerization is from 350 to 800 or so, and the number-average molecular weight is from 70000 to 230000 or so. The cellulose acylate resin may be produced, using an acid anhydride or an acid chloride as an acylating agent. In a most popular production method on an industrial scale, cellulose obtained from a cotton linter or a wood pulp is esterified with a mixed organic acid ingredient including an organic acid (acetic acid, propionic acid, butyric acid) or its acid anhydride (acetic anhydride, propionic anhydride, butyric anhydride) corresponding to an acetyl group or other acyl group, thereby producing a cellulose ester. For the method for producing a cellulose acylate satisfying the above formulae (S-1) and (S-2), referred to are the description in Hatsumei Kyokai Disclosure Bulletin (No. 2001-1745, issued on Mar. 15, 2001, by Hatsumei Kyokai), pp. 7-12, and the methods described in JP-A 2006-45500, 2006-241433, 2007-138141, 2001-188128, 2006-142800, 2007-98917.

The polycarbonate resins usable in the invention include polycarbonate resins having a bisphenol A skeleton, which may be produced through reaction of a dihydroxy ingredient and a carbonate precursor in a mode of interfacial polymerization or melt polymerization. For example, preferred are those described in JP-A 2006-277914, 2006-106386, 2006-284703. For example, a commercial product "Toughlon MD1500" (by Idemitsu) is usable.

The styrenic resins usable in the invention include resins produced through polymerization of styrene and its derivatives, and copolymers with other resins. Not specifically defined without detracting from the effect of the invention, all known styrenic thermoplastic resins are usable herein. Especially preferred are copolymer resins capable of improving the birefringence, the mechanical strength and the heat resistance of films.

The copolymer resins include, for example, styrene/acrylonitrile resins, styrene/acryl resins, styrene/maleic anhydride resins, and their polynary (e.g., binary, ternary) copolymers. Of those, preferred are styrene/acryl resins and styrene/maleic anhydride resin from the viewpoint of the heat resistance and the mechanical strength of films.

Preferably, the styrene/maleic anhydride resin has a composition ratio by mass of styrene to maleic anhydride, styrene/maleic anhydride of from 95/5 to 50/50, more preferably from 90/10 to 70/30. For controlling the intrinsic birefringence of films, the styrene resin may be preferably hydrogenated.

As one example of the styrene/maleic anhydride resins, there is mentioned Nova Chemicals' "Daylark D332".

Also usable as the styrene/maleic anhydride is Asahi Kasei Chemical's "Delpet 98ON" to be mentioned below.

The acrylic resins usable in the invention include resins to be obtained through polymerization of acrylic acid, methacrylic acid or a derivative thereof, and their derivatives. Not specifically defined without detracting from the effect of the invention, all known methacrylic thermoplastic resins are usable in the invention.

Resins to be produced through polymerization of acrylic acid, methacrylic acid or a derivative thereof include, for example, those having a structure of the following general formula (1):

In formula (1), $R^1$ and $R^2$ each independently represent a hydrogen atom or an organic residue having from 1 to 20 carbon atoms. The organic residue is concretely a linear, branched or cyclic alkyl group having from 1 to 20 carbon atoms.

Preferred examples of the monomers to give the resins through polymerization of acrylic acid, methacrylic acid or a derivative thereof include methyl(meth)acrylate, ethyl (meth)acrylate, n-propyl(meth)acrylate, n-butyl (meth)acrylate, tert-butyl(meth)acrylate, n-hexyl (meth)acrylate, 2-chloroethyl(meth)acrylate, 2-hydroxyethyl (meth)acrylate, 3-hydroxypropyl(meth)acrylate, 2,3,4,5,6-pentahydroxyhexyl (meth)acrylate and 2,3,4,5-tetrahydroxypentyl(meth) acrylate. More preferred is methyl(meth)acrylate (hereinafter this may be referred to as "MMA") from the viewpoint of the excellent heat stability of the polymers thereof. One or more of these monomers may be used either singly or as combined. The polymer may be a homopolymer of one of these monomers or a copolymer of two or more of them, or a copolymer with any other resin. From the viewpoint of elevating the glass transition temperature of films, preferred is a copolymer with any other resin.

Of the above-mentioned acrylic copolymer resins, more preferred are those having an MMA unit (monomer unit) of at least 30% by mol of all the monomers constituting the resin. Also preferably, the resins may contain at least one unit selected from lactone ring units, maleic anhydride units and glutaric anhydride units in addition to MMA; and for example, the resins mentioned below are usable.
(1) Acrylic Resin Containing Lactone Ring Unit:
Usable are those described in JP-A 2007-297615, 2007-63541, 2007-70607, 2007-100044, 2007-254726, 2007-254727, 2007-261265, 2007-293272, 2007-297619, 2007-316366, 2008-9378, 2008-76764. More preferred are resins described in JP-A 2008-9378.
(2) Acrylic Resin Containing Maleic Anhydride Unit:
Usable are those described in 2007-113109, 2003-292714, 6-279546, 2007-51233 (acid-modified vinyl resins described therein), 2001-270905, 2002-167694, 2000-302988, 2007-113110, 2007-11565. More preferred are those described in JP-A 2007-113109. Also preferred are commercially-available maleic acid-modified MAS resins (e.g., Asahi Kasei Chemicals' Delpet 980N).
(3) Acrylic Resin Containing Glutaric Anhydride Unit:
Usable are those described in JP-A 2006-241263, 2004-70290, 2004-70296, 2004-126546, 2004-163924, 2004-291302, 2004-292812, 2005-314534, 2005-326613, 2005-331728, 2006-131898, 2006-134872, 2006-206881, 2006-241197, 2006-283013, 2007-118266, 2007-176982, 2007-178504, 2007-197703, 2008-74918, WO2005/105918. More preferred are the resins described in JP-A 2008-74918.

Preferably, the glass transition temperature (Tg) of these resins is from 106° C. to 170° C., more preferably from 110° C. to 160° C., even more preferably from 115° C. to 150° C.

As the thermoplastic resin for use in the invention, preferred are cyclic olefin resins of those mentioned above; more preferred are norbornene resins from the viewpoint of the high transparency, the birefringence expressibility and the heat resistance thereof; and even more preferred are norbornene resins produced through addition polymerization.

In case where the thermoplastic resin is a copolymer, it may be a random copolymer or a block copolymer.
(Additive)

The film of the invention may contain any other material than the above-mentioned thermoplastic resin. Preferably, the film comprises, as the main ingredient thereof, one or more thermoplastic resins. (The main ingredient is meant to indicate the material of which the blend ratio is the highest of all the constitutive ingredients of the composition, and in the embodiment where the composition contains two or more thermoplastic resins as the main ingredient thereof, the total content thereof is higher than the content of any other ingredient in the composition.) The other material than the thermoplastic resin in the composition includes various additives, and their examples are stabilizer, UV absorbent, light stabilizer, plasticizer, fine particles and optical regulator.

Stabilizer:

The film of the invention may contain at least one stabilizer. Preferably, the stabilizer is added before or during hot melting of thermoplastic resin. The stabilizer is effective for antioxidation of film-constituting ingredients, for trapping the acids formed through decomposition, and for retarding or inhibiting the radical group-caused decomposition under light or heat. The stabilizer is effective for inhibiting degradation such as discoloration or molecular weight reduction to be caused by various types of decompositions including decomposition not as yet clarified, and also inhibiting formation of volatile ingredients. The stabilizer is required to be still effective to exhibit its function, without being decomposed at the resin melting temperature at which the resin is formed into a film. Typical examples of the stabilizer include phenol-type stabilizers, phosphite-type stabilizers, thioether-type stabilizers, amine-type stabilizers, epoxy-type stabilizers, lactone-type stabilizers, amine-type stabilizers, metal inactivators (tin-based stabilizers), etc. These are described in JP-A 3-199201, 5-1907073, 5-194789, 5-271471, 6-107854. Preferably, at lest one of phenol-type and phosphite-type stabilizers is used in the invention. Of phenol-type stabilizers, more preferred are those having a molecular weight of at least 500. Preferred phenol-type stabilizers include hindered phenol-type stabilizers.

These materials are readily available as commercial products, and are sold, for example, by the following manufacturers. Ciba Specialty Chemicals provides commercial products of Irganox 1076, Irganox 1010, Irganox 3113, Irganox 245, Irganox 1135, Irganox 1330, Irganox 259, Irganox 565, Irganox 1035, Irganox 1098, Irganox 1425WL. Asahi Denka Kogyo provides commercial products of Adekastab AO-50, Adekastab AO-60, Adekastab AO-20, Adekastab AO-70, Adekastab AO-80. Sumitomo Chemical provides commercial products Sumilizer BP-76, Sumilizer BP-101, Sumilizer GA-80. Shipro Chemical provides commercial products Seenox 326M, Seenox 336B.

As phosphite-type stabilizers, more preferred are the compounds described in JP-A 2004-182979, paragraphs [0023]-[0039]. Specific examples of phosphite-type stabilizers include compounds described in JP-A 51-70316, 10-306175, 57-78431, 54-157159, 55-13765. As other stabilizers, preferred are the materials described in detail in Hatsumei Kyokai Disclosure Bulletin (No. 2001-1745, issued on Mar. 15, 2001, by Hatsumei Kyokai), pp. 17-22.

The phosphite-type stabilizers are preferably high-molecular ones for securing the stability thereof at high temperatures, having a molecular weight of at least 500, more preferably at least 550, even more preferably at least 600. Also preferably, the stabilizers have an aromatic ester group as at least one substituent therein. Also preferably, the phosphite-type stabilizers are triesters, more preferably not mixed with impurities of phosphoric acid, monoester or diester. In case where the stabilizer contains such impurities, preferably, the content of the impurities is at most 5% by mass, more preferably at most 3% by mass, even more preferably at most 2% by mass. For the stabilizers of the type, usable are the compounds described in JP-A 2004-182979, [0023] to [0039], and also usable are the compounds described in JP-A51-70316, 10-306175, 57-78431, 54-157159, 55-13765. Preferred examples of phosphite-type stabilizers are mentioned below. However, the phosphite-type stabilizers for use in the invention should not be limited to these.

Asahi Denka provides commercial products of Adekastab 1178, 2112, PEP-8, PEP-24G, PEP-36G, HP-10; and Clariant provides commercial products of Sandostab P-EPQ. Also preferred for use herein are stabilizers having both phenol and phosphite moieties in one molecule. The compounds are described in detail in JP-A 10-273494, and their examples are, but not limited thereto, within the scope of the examples of the stabilizers mentioned in the above. Typically, Sumitomo Chemical provides commercial products of Sumilizer GP. Further, Sumitomo Chemical provides other commercial products of Sumilizer TPL, TPM, TPS, TDP. Asahi Denka Kogyo provides commercial products of Adekastab AO-412S.

One or more of the above-mentioned stabilizers may be used herein either singly or as combined. Not detracting from the object of the invention, the amount of the stabilizer to be in the film may be suitably determined. Preferably, the amount of the stabilizer to be added is from 0.001 to 5% by mass relative to the mass of the thermoplastic resin, more preferably from 0.005 to 3% by mass, even more preferably from 0.01 to 0.8% by mass.

UV Absorbent:

The film of the invention may contain one or more UV absorbents. The UV absorbent is preferably one excellent in the ability of absorbing UV rays having a wavelength of not longer than 380 nm from the viewpoint of antioxidation, and not so much absorbing visible rays having a wavelength of not shorter than 400 nm from the viewpoint of transparency. For example, there are mentioned oxybenzophenone-type compounds, benzotriazole-type compounds, salicylate-type compounds, benzophenone-type compounds, cyanoacrylate-type compounds, and nickel complex-type compounds. Especially preferred UV absorbents are benzotriazole-type compounds and benzophenone-type compounds. Above all, benzotriazole-type compounds are more preferred as causing little unnecessary coloration of cellulose mixed esters. These are described in JP-A 60-235852, 3-199201, 5-1907073, 5-194789, 5-271471, 6-107854, 6-118233, 6-148430, 7-11056, 7-11055, 7-11056, 8-29619, 8-239509, 2000-204173.

The amount of the UV absorbent to be added is preferably from 0.01 to 2% by mass of the thermoplastic resin, more preferably from 0.01 to 1.5% by mass.

Light Stabilizer:

The film of the invention may contain one or more light stabilizers. The light stabilizer includes hindered amine-type light stabilizers, HALS compounds, more concretely, 2,2,6,6-tetraalkylpiperidine compounds and their acid addition salts and their complexes with metal compounds, as in U.S. Pat. No. 4,619,956, columns 5-11, and U.S. Pat. No. 4,839,405, columns 3-5. Regarding these, Asahi Denka provides commercial products of Adekastab LA-57, LA-52, LA-67, LA-62, LA-77; and Ciba Speciality Chemicals provides commercial products of TINUVIN 765, 144.

One or more of these hindered amine-type light stabilizers may be used either singly or as combined. Needless-to-say, the hindered amine-type light stabilizer may be used, as combined with other additives such as plasticizer, stabilizer, UV absorbent, etc.; and it may be incorporated as a part of the molecular structure in these additives. The amount of the light stabilizer may be determined within a range not detracting from the effect of the invention, and in general, it may be from 0.01 to 20 parts by mass or so relative to 100 parts by mass of the thermoplastic resin, more preferably from 0.02 to 15 parts by mass or so, even more preferably from 0.05 to 10 parts by mass or so. The light stabilizer may be added in any stage of preparing a melt of thermoplastic resin composition, and for example, it may be added in the final step or preparing the melt.

Plasticizer:

The film of the invention may contain a plasticizer. Adding a plasticizer to the film is favorable from the viewpoint of film reformation, for example, for improving the mechanical properties of the film, imparting flexibility to the film, imparting water absorbability to the film or reducing the moisture permeability of the film. In case where the film of the invention is produced according to a melt casting method, a plasticizer may be added to the film for the purpose of depressing the melting temperature of the film-constituting material through plasticizer addition thereto, than the glass transition temperature of the thermoplastic resin used, or for the purpose of reducing the viscosity of the resin composition at the same heating temperature than that of the thermoplastic resin to which the plasticizer is not added. For example, for the film of the invention, preferably used are plasticizers selected from phosphate derivatives and carboxylate derivatives. In addition, also preferably used are polymers produced through polymerization of ethylenic unsaturated monomers and having a weight-average molecular weight of from 500 to 10000, as in JP-A 2003-12859, as well as acrylic polymers, acrylic polymers having an aromatic ring in the side branches, and acrylic polymers having a cyclohexyl group in the side branches.

Fine Particles:

The film of the invention may contain fine particles. The fine particles include fine particles of inorganic compounds, and fine particles of organic compounds, and any of these are usable herein. The mean primary particle size of the fine particles to be in the thermoplastic resin for use in the invention is preferably from 5 nm to 3 μm from the viewpoint of reducing the haze of the film, more preferably from 5 nm to 2.5 μm, even more preferably from 10 nm to 2.0 μm. The mean primary particle size of the fine particles is determined as follows: A thermoplastic resin composition is observed with a transmission electronic microscope (having a magnification of from 500,000 to 1,000,000 powers), and the primary particle size of 100 particles therein is measured, and the data are averaged to be the mean primary particle size of the fine particles. The amount of the fine particles to be added is preferably from 0.005 to 1.0% by mass relative to the thermoplastic resin, more preferably from 0.01 to 0.8% by mass, even more preferably from 0.02 to 0.4% by mass.

Optical Regulator:

The film of the invention may contain an optical regulator. The optical regulator includes a retardation regulator, for which, for example, usable are those described in JP-A 2001-166144, 2003-344655, 2003-248117, 2003-66230. The optical regulator, if added to the film, may control the in-plane retardation (Re) and the thickness-direction retardation (Rth) of the film. Preferably, the amount of the optical regulator to be added is from 0 to 10% by mass, more preferably from 0 to 8% by mass, even more preferably from 0 to 6% by mass.

On the other hand, the film of the invention preferably comprises a thermoplastic resin, not substantially containing a polymerizing liquid crystal compound generally for use in a film produced through coating, in order that it can express optical compensation capability as it has a single-layer constitution. The polymerizing liquid crystal compound as referred to in the invention is meant to indicate a liquid crystal compound, which is applied to a support, then aligned and polymerized thereon, and thereafter processed for fixation of the alignment state thereof, as in JP-A2001-328973, 2006-227630, 2006-323069, 2007-248780. In the film of the invention, the content of the polymerizing liquid crystal compound of the type is preferably less than 10% by mass, more preferably less than 5% by mass.

The polymerizing liquid crystal compound includes, for example, those described in JP-A2001-328973, [0008] to [0034]; JP-A 2006-227630, [0017]; JP-A 2007-248780, [0014] to [0097].

[Film Production Method]

The method for producing the film of the invention (hereinafter this may be referred to as the production method of the invention) comprises a step of leading a melt of a composition containing a thermoplastic resin to pass between a first nip-pressing surface and a second nip-pressing surface of a nip-pressing unit, thereby continuously nip-pressing it therebetween to form a nip-pressed film, and a step of stretching the nip-pressed film in the direction differing from the film traveling direction with holding both sides of the film, wherein the moving speed of the first nip-pressing surface is higher than the moving speed of the second nip-pressing surface and the stretching is attained at a temperature falling within a range of from $(Tg-40)°$ C. to $(Tg+5)°$ C. and wherein Tg means the glass transition temperature of the thermoplastic resin. The nip-pressed film produced by providing a moving speed difference between the first nip-pressing surface and the second nip-pressing surface of the nip-pressing unit shall have a slow axis in MD; however, when the nip-pressed film is laterally stretched, then its slow axis changes from MD to a direction differing from MD. Film formation under the condition provides the film of the invention. In this description, the stretching temperature in the stretching step is the film surface temperature.

(Control of Re Distribution of the Nip-Pressed Film in the Cross Direction)

In the production method of the invention, the nip-pressed film preferably has a ratio of Re[0°] at a side of the film to Re[0°] at the center part of the film (side/center) of 0.5 to 0.99. That is, in the preferred embodiment of the production method of the invention, the nip-pressed film obtained by nip-pressing the melt (that is a film prior to the stretching step) is controlled to have a ratio of Re[0°] at a side of the film to Re[0°] at the center part of the film of 0.5 to 0.99 whereby the curl of the film after the lateral stretching step described below is suppressed and temporal change rate of γ is improved, and it is preferable that when the film is incorporated in a TN-mode liquid crystal display device, its viewing angle is enlarged and the peripheral unevenness of the display panel is improved. Control of the ratio of Re[0°] at a side of the film to Re[0°] at the center part of the film to be within the range of 0.7 to 0.99 is more preferable from the viewpoint that the curl of the film after the lateral stretching step is further suppressed and the peripheral unevenness of the display panel is more improved when the film is incorporated in a TN-mode liquid crystal display device. More preferable range is 0.9 to 0.99.

Not adhering to any theory, it is generally observed that when a film composed of a thermoplastic resin is laterally stretched, the center part in the width direction of the film (i.e. the direction perpendicular to the film travelling direction) is stretched more easily than the sides of the film. Thus, the alignment in the sides is generally slower than the alignment in the center. The film after the lateral stretching has different alignment degrees between the center part and the sides of the film, which causes internal unevenness. The film composed of a thermoplastic resin generally tends to curl. To reduce the difference of alignment degree between the center part in the width direction and the sides of the film, the film was stretched at a high draw ratio under the prior art. The stretching at a high draw ratio tends to maintain the internal unevenness and causes relaxation while time passes and thereby the film after the lateral stretching tends to reduce the temporal stability of its optical properties. Particularly, an optical film having a tilt structure has uneven alignment degree in the thickness direction of the film, and when it is stretched laterally by a general method of the prior art, curl and deterioration of the temporal stability of the film have been often observed.

Contrary to this, in a preferable embodiment of the production method of the invention, a nip-pressed film which has been processed so that Re in the sides thereof is smaller than Re in the center part thereof is used. Thus, the production method of the invention preferably includes the step of controlling the Re distribution in the width direction of the nip-pressed film. In a preferable embodiment of the production method of the invention, Re[0°] in the sides is controlled to be smaller than Re[0°] in the center part to thereby prevent the phenomenon that the center part is easily stretched in the lateral stretching process, and as a result to obtain a laterally-stretched optical film having even alignment degree in the width direction with Re[0°] in the sides being almost equal to Re[0°] in the sides.

The film having the above Re distribution in the width direction can be processed by the following methods to satisfy the above range: (i) the method wherein a nip-pressing surface having a crown is used as at least one of the nip-pressed surfaces in the nip-pressing unit, (ii) the method wherein a nip-pressing surface having a stepped structure is used as at least one of the nip-pressed surfaces in the nip-pressing unit, (iii) the method wherein the melt fed from the melt-feeding unit for supplying a composition containing a thermoplastic resin is led to pass between the first nip-pressing surface and the second nip-pressing surface constituting the nip-pressing unit to conduct side-free nip-pressing, and (iv) the method wherein the sides of the nip-pressed film are slit. In a preferable embodiment of the production method of the invention, the film having the Re distribution in the width direction may be produced by any one of the above methods or a combination thereof.

Hereinafter, the production method of the invention is described in detail, together with a method for controlling the Re distribution in the width direction of the nip-pressed film.
(Nip-Pressing Unit)

The nip-pressing unit having a first nip-pressing surface and a second nip-pressing surface individually running at a different peripheral speed includes, for example, a combination of two rolls individually running at a different peripheral speed, a combination of a roll and a touch belt individually running at a different peripheral speed as in JP-A2000-219752 (one-side belt system), a combination of a belt and a belt (double-side belt system), etc. Of those, preferred is a combination of two rolls individually running at a different peripheral speed, as capable of imparting a uniform high pressure of from 20 to 500 MPa to the resin melt. The roll pressure may be measured by leading a pressure test film (e.g., FUJIFILM's middle-pressure prescale) to pass between two rolls.
<Feeding of Melt of Thermoplastic Resin Composition>

In the production method of the invention, first, a thermoplastic resin-containing composition (hereinafter this may be referred to as thermoplastic resin composition) is melt-extruded. The method includes a step of leading a melt of the thermoplastic resin composition to pass between a first nip-pressing surface and a second nip-pressing surface of a nip-pressing unit, thereby continuously nip-pressing it therebetween to form a nip-pressed film (hereinafter this may be referred to as "nip-pressing step"). In the nip-pressing step, the means of feeding the melt of a thermoplastic resin-containing composition to the unit is not specifically defined. For example, as a concrete means for feeding the melt, employable is an embodiment of using an extruder through which a thermoplastic resin composition is melted and extruded as a film; or an embodiment of using an extruder and a die; or an embodiment of once solidifying a thermoplastic resin into a film, then melting it with a heating means into a melt, and thereafter feeding it to a film formation step.

The film production method of the invention preferably includes the step of melt-extruding a thermoplastic resin-containing composition through a die and the step of leading the thus-extruded melt to pass between a first nip-pressing surface and a second nip-pressing surface of a nip-pressing unit, from the viewpoint of more effectively retarding the fluctuation of the optical properties of the films to be produced.

In the case where the thermoplastic resin composition is melt-extruded, preferably, the thermoplastic resin composition is pelletized before it is melt-extruded. Some commercial products of thermoplastic resin (e.g., TOPAS #6013, Toughlon MD1500, Delpet 980N, Daylark D332) are in the form of pellets; however, others not in the form of pellets may be processed according to the method mentioned below. As the thermoplastic resin for use in the method, employable are the thermoplastic resins that may be in the film of the invention, and their preferred ranges may apply to the production method.

The thermoplastic resin composition is dried, then melted in a double-screw kneading extruder at 150° C. to 300° C., then extruded like noodles, and solidified and cut in air or in water, thereby giving pellets. After melted in the extruder, the melt may be directly cut while extruded into water through a nozzle thereby giving pellets, according to an underwater cutting method. The extruder usable for pelletization includes a single-screw extruder, a non-engaging counter-rotating double-screw extruder, an engaging counter-rotating double-screw extruder, an engaging uni-rotating double-screw extruder, etc. Preferably, the number of revolutions of the extruder is from 10 rpm to 1000 rpm, more preferably from 20 rpm to 700 rpm. The extruder residence time is preferably from 10 seconds to 10 minutes, more preferably from 20 seconds to 5 minutes.

Not specifically defined, the size of the pellets may be generally from 10 mm³ to 1000 mm³ or so, preferably from 30 mm³ to 500 mm³ or so.

Preferably, prior to feeding the melt of thermoplastic resin composition, the water content of the pellets is reduced. Preferably, the drying temperature is from 40 to 200° C., more preferably from 60 to 150° C. Accordingly, the water content is preferably reduced to at most 1.0% by mass, more preferably at most 0.1% by mass. Also preferably, the amount of the solvent in the pellets is reduced. The preferred drying temperature may be the same as that for reducing the water content. Accordingly, the residual solvent amount in the film of the invention may be controlled to fall within a preferred range. The drying may be attained in air, or in nitrogen, or in vacuum.

In case where the resin composition is melt-extruded through an extruder, the dried pellets are fed into the cylinder via the feeding port of the extruder, and kneaded and melted therein. Preferably, the inside of the cylinder comprises, for example, a feeing zone, a pressing zone, and a metering zone in that order from the side of the feeing port. The screw compression ratio of the extruder is preferably from 1.5 to 4.5; the ratio of the cylinder length to the cylinder inner diameter (L/D) is preferably from 20 to 70; and the cylinder inner diameter is preferably from 30 mm to 150 mm. The extrusion temperature of the feeding means (e.g., die) for feeding the thermoplastic resin composition (hereinafter this may be referred to as "melt temperature") may be determined depending on the melting temperature of the thermoplastic resin, and in general, it is preferably from 190 to 300° C. or so. Further, for preventing the resin melt from being oxidized with the remaining oxygen in the extruder, preferably, the extruder is purged with an inert gas (e.g., nitrogen), or is degassed in vacuum via a vent.

Preferably, a filter unit with a breaker plate-type filter or a leaf-type disc filter is fitted to the system for removing impurities from the thermoplastic resin composition by filtration therethrough. The filtration may be one-stage or multi-stage filtration. Preferably, the filtration accuracy is from 15 μm to 3 μm, more preferably from 10 μm to 3 μm. Stainless steel is preferred for the filter material. The filter constitution includes knitted wire nets, and sintered metal fiber or metal powder articles (sintered filters); and preferred are sintered filters.

For increasing the film thickness accuracy by reducing the melt discharge fluctuation, preferably, a gear pump is disposed between the extruder and the thermoplastic resin composition feeding means (e.g., die). Accordingly, the resin pressure fluctuation inside the thermoplastic resin composition feeding means (e.g., die) may be reduced to ±1%. For enhancing the constant feeding capability of the gear pump, there may be employed a method of changing the number of screw revolutions to thereby constantly control the pressure before the gear pump.

In the extruder having the constitution as above, the resin composition is melted, and if desired, the resin melt is led to pass through a filter and a gear pump, and thereafter it is continuously transferred to the thermoplastic resin composition feeding means (e.g., die). The die may be in any type of a T-die, a fishtail die, or a hanger coat die. Preferably, just before the thermoplastic resin composition feeding means (e.g., die), a static mixer may be disposed for enhancing the uniformity of the resin temperature.

In case where the feeding means is a die, the clearance at the die outlet port part (hereinafter this may be referred to as "lip gap") is generally from 1.0 to 30 times the film thickness, more preferably from 5.0 to 20 times. Concretely, it is preferably from 0.04 to 3 mm, more preferably from 0.2 to 2 mm, even more preferably from 0.4 to 1.5 mm.

In the production method of the invention, the radius of curvature at the tip of the die lip is not specifically defined, and any known die may be used in the invention.

Preferably, the die thickness is controllable within a range of from 5 to 50 mm. An automatic thickness-controlling die is also effective, for which the film thickness and the thickness deviation in the downstream area are computed, and the data are fed back to the die for thickness control thereof.

Apart from the single-layer film forming apparatus, a multilayer film forming apparatus is also usable herein.

The residence time taken by the thermoplastic resin composition to run into the extruder via the feeding port and then go out of it via the feeding means (e.g., die) is preferably from 3 minutes to 40 minutes, more preferably from 4 minutes to 30 minutes.

<Nip-Pressing Step>

Next, the fed melt of thermoplastic resin composition is led to pass between the first nip-pressing surface and the second nip-pressing surface of a nip-pressing unit and is thereby continuously nip-pressed therebetween to form a film, which is then cooled and solidified. In this stage, preferably, the melt is released earlier from any one of the first nip-pressing surface and the second nip-pressing surface and thereafter from the other one, from the viewpoint of the production stability. In the production method of the invention, the moving speed of the first nip-pressing surface is higher than the moving speed of the second nip-pressing surface, and the surface from which the melt is released earlier than from the other may be either the first nip-pressing surface or the second nip-pressing surface; however, from the viewpoint of inhibiting formation of peel lumps, the surface from which the melt is released earlier is preferably the first nip-pressing surface (running at a higher moving speed).

In the production method of the invention, preferably, a pressure of from 20 to 500 MPa is given to the melt in the above-mentioned nip-pressing unit from the view point that the magnitude of the tilt structure of the obtained film can be enlarged, that γ thereof can be enlarged more, that the part of the film having a largest birefringence can be controlled to fall within a range of from 10 to 90% in the thickness direction of the film, and that, when the film is incorporated in a TN-mode liquid crystal display device, it is more effective for enlarging the viewing angle of the device and for preventing the peripheral unevenness of the device.

More preferably in the production method of the invention, the pressure to be given to the melt in the nip-pressing unit is from 25 to 300 MPa from the view point that the part of the film having a largest birefringence can be controlled to be at most 85% in the thickness direction of the film, and that, when the film is incorporated in a TN-mode liquid crystal display device, it is more effective for enlarging the viewing angle of the device and for preventing the peripheral unevenness of the device.

Even more preferably, the pressure to be given to the melt in the nip-pressing unit is from 25 to 200 MPa, still more preferably from 30 to 150 MPa.

In the production method of the invention, preferably, the ratio of the moving speed of the second nip-pressing surface to that of the first nip-pressing surface in the nip-pressing unit, as defined by the following formula (IV), is controlled to be from 0.60 to 0.99. More preferably, the moving speed ratio in the nip-pressing unit is from more than 0.60 to 0.99, even more preferably from 0.75 to 0.98.

Moving Speed Ratio=(speed of second nip-pressing surface)/(speed of first nip-pressing surface)  (IV)

When the moving speed ratio of the two nip-pressing surfaces is at least 0.60, it is favorable since the obtained film can have large γ and can satisfy the above-mentioned formula (II). When the moving speed ratio is at least 0.60, then it is also favorable since the surface of the obtained film is hardly scratched and the uniformity of the optical properties of the film can be enhanced. When the moving speed ratio of the two nip-pressing surfaces is from more than 0.60 to 0.99, then it is more favorable since γ of the obtained film can be controlled to a degree not more than the uppermost limit of the above-mentioned formula (II') and, when the obtained film is incorporated in a TN-mode liquid crystal display device, then it is more effective for enlarging the viewing angle of the device.

(Melt Temperature)

In the production method of the invention, the melt temperature (temperature of the melt of thermoplastic resin composition at the outlet port of feeding means) is preferably from (Tg+50) to (Tg+200)° C. from the viewpoint of improving the shapability of the melt of thermoplastic resin composition and of preventing the deterioration thereof, more preferably from (Tg+70) to (Tg+180)° C., even more preferably from (Tg+90) to (Tg+150)° C. Specifically, when the melt temperature is not lower than (Tg+50)° C., then the shapability of the melt of thermoplastic resin composition is good since the viscosity of the melt can be sufficiently low; and when the temperature is not higher than (Tg+200)° C., then the melt of thermoplastic resin composition may hardly deteriorate.
(Air Gap)

In case where a thermoplastic resin composition is fed to a nip-pressing unit through a feeding means such as a die according to the production method of the invention, the air gap (the distance from the outlet port of the feeding means to the melt landing point) is preferably as small as possible from the viewpoint of keeping the temperature of the melt staying in the air gap, and concretely, the air gap is preferably from 10 to 300 mm, more preferably from 20 to 250 mm, even more preferably from 30 to 200 mm.
(Line Speed)

In the production method of the invention, the line speed (film formation speed) is not lower than 2 m/min from the viewpoint of keeping the temperature of the melt staying in the air gap, more preferably not lower than 5 m/min, even more preferably not lower than 10 m/min. When the line speed is high, then the melt can be prevented from being cooled in the air gap and therefore more uniform shear deformation can be given to the melt while still hot in the nip-pressing unit. The line speed indicates the speed at which the melt of thermoplastic resin composition passes through the nip-pressing unit, and the film traveling speed in the conveyance unit.

Preferably, in the production method of the invention, the temperature of the first nip-pressing surface and the second nip-pressing surface is set to fall between (Tg−70° C.) and (Tg+10° C.) where Tg indicates the glass transition temperature of the resin melt to be nip-pressed, more preferably between (Tg−50° C.) and (Tg+5° C.), even more preferably between (Tg−40° C.) and Tg. Also preferably, the temperature is lower by from 20° C. to 200° C. than the temperature of the resin melt to be nip-pressed, more preferably by from 20° C. to 150° C., even more preferably by from 20° C. to 100° C. The temperature control may be attained by introducing a temperature-controlled liquid or vapor into the area between the nip-pressing surfaces. Further, for controlling the difference between Re[+40°] and Re[−40°], there may be made a difference between the surface temperature of the first nip-pressing surface and that of the second nip-pressing surface. Preferably, the temperature difference is from 5° C. to 80° C., more preferably from 20° C. to 80° C., even more preferably from 20° C. to 60° C.
(Side-Free Nip-Pressing)

In the production method of the invention, the width of the melt is not specifically defined, and may be, for example, from 200 to 2000 mm.

On the other hand, in the production method of the invention for producing the above-mentioned nip-pressed film, the melt may be led to pass between the first nip-pressing surface and the second nip-pressing surface of the nip-pressing unit while both sides thereof is kept away from contact with the first and second nip-pressing surface (hereinafter this may be referred to as "side-free nip-pressing") thereby producing the nip-pressed film having an Re distribution in the film width direction. The side-free nip-pressing method is not specifically defined, in which the width of the melt may be varied in accordance with the width of the nip-pressing surfaces, or the nip-pressing surfaces may be varied in accordance with the width of the melt. In case where the nip-pressing surfaces are varied, the nip-pressing surfaces may have an overall width of such a degree that a part of from 50 to 500 mm from both sides of the filmy melt is kept away from contact with the nip-pressing surfaces, or the nip-pressing surfaces may be so designed that the surfaces can be free from contact with the thick part of both sides of the melt. In case where the nip-pressed film having an Re distribution in the film width direction is produced according to the side-free nip-pressing method, it is desirable that the part of from 50 to 500 mm from both sides of the melt is kept free from contact with the nip-pressing surfaces, more preferably the part of from 80 to 400 mm is kept free from contact with them. The width of both sides of the melt kept free from contact with the nip-pressing surfaces may be defined in any desired manner in accordance with the thickness of the film to be produced and not contradictory to the production method of the invention.
(Structure of Nip-Pressing Surface)

Preferably, the nip-pressing surface is a rigid nip-pressing surface, more preferably a metallic rigid nip-pressing surface from the viewpoint of imparting a high linear pressure and a high shearing stress to the melt. In this description, the "rigid" nip-pressing surface is not determined by only the material of the nip-pressing surface but may be determined in consideration of the ratio of the thickness of the rigid material used in the part of the nip-pressing surface to the thickness of the structure to support the nip-pressing surface; and for example, in case where the nip-pressing surface is driven by a spherical supporting roll, the "rigid" nip-pressing surface means that the ratio of the thickness of the external cylinder formed of a rigid material to the diameter of the supporting roll is, for example, at least 1/35 or so. Also to other cases where the nip-pressing surface is supported and driven by any other mechanism, the same shall apply as in the case where the nip-pressing surface is driven by a spherical support roll. Further in this description, the "metallic and rigid" nip-pressing surface (or roll) of a nip-pressing unit means that at least the entire nip-pressing surface is metallic and the nip-pressing surface (or roll) of the nip-pressing unit is "rigid".

In case where nip-pressing surfaces capable of attaining the side-free nip-pressing mode in the production method of the invention are employed here, the nip-pressing surfaces may be designed in any manner of such that the surfaces are kept free from contact with both sides of the melt, or are kept free from contact with one side thereof only. From the viewpoint of increasing the pressure to the center of the film and reducing the pressure to the sides thereof, the nip-pressing surfaces are preferably so designed that they are kept free from contact with both sides of the melt.
(Stepped Structure)

In the production method of the invention, at least one of the first nip-pressing surface and the second nip-pressing surface preferably has a stepped structure from the viewpoint of reducing the pressure to the thick portion of the sides of the melt caused by the neck-in phenomenon of the melt. The shape of the "step" is not specifically defined. Preferably, for example, a "step" is formed in the part of from 10 to 150 mm from both sides of the nip-pressing surface; and the depth of the "step" is preferably from 0.03 to 1 mm. With that, the linear pressure of the touch to the sides of the nip-pressed film formed in the nip-pressing step could be lower than that to the center part thereof, and the ratio of Re[0°] of the sides of the thermoplastic resin film to be stretched to Re[0°] of the center part thereof could be controlled to fall within the above-mentioned preferred range.
(Crown Level)

In the production method of the invention, preferably, at least one of the first nip-pressing surface and the second nip-pressing surface has a crown.

Use of at least one nip-pressing surface having a crown is effective for reducing the pressure to the thick portion of the side of the melt caused by the neck-in phenomenon before the melt is nip-pressed, and for preventing the phenomenon that the linear pressure to the center part of the nip-pressing surface lowers owing to the deformation of the nip-pressing surface caused by application of a high pressure to the melt. The neck-in phenomenon means that the width of the melt fed from the melt-feeding unit narrows before it reaches the nip-pressing unit from the feeding unit, and it is known that in melt film formation using a nip-pressing unit, both sides of the melt are thick.

The crown level greatly varies depending on the width and the thickness of the nip-pressing surface and the pressing pressure, and its suitable range is not specifically defined. Preferably, however, the crown level is from 0.005 to 10 mm, more preferably from 0.01 to 5 mm, even more preferably from 0.02 to 2 mm.

In case where at least one of the first nip-pressing surface or the second nip-pressing surface (for example, touch roll or chill roll) has a crown, the pressure may be concentrated in some degree in the center part in the lateral direction of the nip-pressing surface; and in such a case, therefore, even when a high pressure is given to the melt, the first nip-pressing surface and the second nip-pressing surface (for example, touch roll or chill roll) can be flexed uniformly. Accordingly, the ratio of Re[0°] of the sides of the nip-pressed film (thermoplastic resin film to be stretched) formed in the nip-pressing step to Re[0°] of the center part thereof could be controlled to fall within the above-mentioned preferred range.

In the production method of the invention, preferably, at least one of the first nip-pressing surface or the second nip-pressing surface has a crown and both the first nip-pressing surface and the second nip-pressing surface are metallic and rigid.

(Backup Roll)

In the production method of the invention, in case where the nip-pressing surface has a crown, the flexing degree of the crown-having nip-pressing surface of the first nip-pressing surface or the second nip-pressing surface is preferably controllable by a backup roll. An embodiment of the method of the invention where the nip-pressing unit comprises two rolls and where a backup roll is used therein is described below.

(Casting Through Two Rolls)

As the method of leading a thermoplastic resin melt to pass between the first nip-pressing surface and the second nip-pressing surface of a nip-pressing unit and nip-pressing it therebetween to form a film, preferred is an embodiment of leading the resin melt to pass between two rolls (e.g., touch roll (first roll) and chill roll (second roll)). In case where the nip-pressing unit includes two rolls individually running at a different peripheral speed, the surface of the roll running at a higher peripheral speed is the first nip-pressing surface, and the surface of the roll running at a lower peripheral speed is the second nip-pressing surface. In this description, when the filming system includes plural casting rolls for conveying the resin melt, the casting roll nearest to the most upstream thermoplastic resin composition feeding means (e.g., die) may be the chill roll. The preferred embodiment of the production method of the invention where two rolls are used is described below.

In the film production method of the invention, the landing point at which the melt extruded out from the above-mentioned feeding means lands is not specifically defined. The distance between the melt landing point and the perpendicular line that runs through the center point in the space at a part at which the touch roll and the casting roll are kept nearest to each other may be zero, or the two may be deviated.

The melt landing point is meant to indicate the point at which the melt extruded out from the feeding means is first brought into contact with the touch roll or the chill roll (or first lands on the roll). The center point of the space between the touch roll and the casting roll is meant to indicate the center point of the touch roll surface and the casting roll surface at the site at which the space between the touch roll and the casting roll is the narrowest.

Preferably, the surface of the two rolls (e.g., touch roll, casting roll) has an arithmetic mean height Ra of at most 100 nm, more preferably at most 50 nm, even more preferably at most 25 nm.

In the production method of the invention, the width of the two rolls is not specifically defined. The width may be freely varied in accordance with the width of the film melt.

In the production method of the invention, the cylinder parameter values may be suitably changed for increasing the roll pressure to fall within the above-mentioned range. The cylinder parameter values may differ depending on the resin material to be used and the materials of the two rolls. For example, when the effective width of the film melt is 200 mm, the value is preferably from 3 to 100 KN, more preferably from 3 to 50 KN, even more preferably from 3 to 25 KN.

In the production method of the invention, preferably, the Shore hardness of the rolls is at least 30 HS for increasing the roll pressure to fall within the above-mentioned range, more preferably at least 45 HS. In the invention, the film is continuously formed while the roll pressure is kept high, and therefore, when impurities in the film or dust and others in air are led between the rolls, then the rolls may be dented or may be scratched. Accordingly, the Shore hardness of the two rolls is preferably at least 50 HS, more preferably from 60 to 90 HS.

The Shore hardness is determined according to a method of JIS Z2246 where a roll is tested at 5 points in the roll width direction and at 5 points in the roll peripheral direction and the data are averaged.

Regarding their material, preferably, the two rolls are made of metal from the viewpoint of attaining the above-mentioned Shore hardness, more preferably they are made of stainless metal. Also preferred are surface-plated rolls. The Shore hardness of the rolls may be attained according to a method of quenching/tempering, for example, as in Metal Data Book (edited by the Japan Institute of Metals), Chap. 3. Preferably, the two rolls are made of metal, as their surface roughness is low and therefore the surface of the produced film is hardly scratched. On the other hand, rubber rolls and rubber-lined metal rolls are also usable with no limitation so far as they can attain the above-mentioned roll pressure.

As the touch roll, for example, herein usable are those described in JP-A 11-314263, 2002-36332, 11-235747, WO97/28950, JP-A 2004-216717, 2003-145609.

In the production method of the invention, the peripheral speed ratio of the two rolls between which a filmy melt is led to pass may be controlled to thereby impart a shearing stress to the resin melt passing between the two rolls in producing the film of the invention.

For producing the film of the invention, any of the two rolls may run faster. In case where the touch roll runs faster, a bank (an excessive melt staying on the roll to form a deposit thereon) is formed on the side of the touch roll. The touch roll has a short period of time for which it is kept in contact with the melt, and therefore the bank formed on the side of the touch roll could not be fully cooled, therefore giving peel lumps and thereby causing surface failures. Accordingly, it is desirable that the roll running slower is the chill roll (second roll) and the roll running faster is the touch roll (first roll).

In the production method of the invention, the two rolls are preferably those having a large diameter. Concretely, the two rolls have a diameter of from 200 mm to 1500 mm, more preferably from 300 mm to 1000 mm, even more preferably from 350 mm to 800 mm, still more preferably from 350 to 600 mm, further preferably from 350 to 500 mm. When rolls having such a large diameter are used, then the contact area between the filmy melt and the rolls may be large and the time for which a shear force is given to the film melt is prolonged with the result that films having a large difference between Re[+40°] and Re[−40°] can be produced while reducing the fluctuation in Re[0°], Re[+40°] and Re[−40°] thereof. Also desirably, the deformation of the rolls can be reduced. In the production method of the invention, the two rolls may have the same or different diameter.

In the production method of the invention, the two rolls are driven at a different peripheral speed. The two rolls may be driven dependently or independently, but preferably, they are driven independently for retarding the fluctuation in Re[0°], Re[+40°] and Re[−40°] of the films to be produced.

In the production method of the invention where the two rolls are a touch roll and a chill roll, when the melt is nip-pressed in the nip-pressing unit, the method preferably includes a step of pressing the touch roll toward the direction of the chill roll by the use of a backup roll covered with a rubber having a Shore A hardness of at least 70 HS, from the viewpoint of equalizing the optical properties of the produced films.

Use of such a backup roll makes it possible to uniformly flex the touch roll even though the touch roll is a metallic rigid roll, and further, even though the chill roll is a metallic rigid roll, and as a result, the pressure to be given to the melt can be equalized. In particular, in case where a melt is led to pass through two metallic and rigid rolls, when a high pressure is given to the melt, then the touch roll and the chill roll may deform nonuniformly, and if so, it may be difficult to keep the gap between the touch roll and the chill roll constant. In this case, the pressure to the melt may differ in the lateral direction. As opposed to this, when a backup roll is used for pressing the touch roll toward the chill roll, then both the touch roll and the chill roll may be deformed equally on the same flexing level. In particular, in the production method of the invention, in case where at least one of the touch roll and the chill roll has a crown, a pressure may be concentrated in some degree to the center part in the width direction of the touch roll, and in this case, therefore, even when a high linear pressure is given to the melt, both the touch roll and the chill roll may be uniformly flexed.

Preferably, the backup roll is covered with rubber from the viewpoint that the contact area between the backup roll and the crown-having touch roll may be controlled to a preferred level. Precisely, when the backup roll is covered with rubber, then it is desirable since a more uniform pressure may be given to the melt than in the case where the backup roll surface is metallic. When the backup roll is covered with a rubber having a Shore A hardness of at least 70 HS, then it is favorable since the rubber roll deformation and heating can be prevented when a high pressure is given to the melt and therefore the roll life may be prolonged.

The type of the rubber usable for the backup roll is not specifically defined; and for example, preferred for it are fluororubber, heat-resistant NBR rubber, silicone rubber. Of those, more preferred is fluororubber from the viewpoint that it is durable and the additive does not bleed out of it.

The means of pressing the touch roll to the direction of the chill roll by the use of the backup roll is not specifically defined. In particular, when the part to support the shaft of the backup roll is on both sides of the backup roll, it is desirable that the part to support the shaft of the backup roll on both sides thereof is pushed by the same force from the viewpoint that the chill roll is pressed to the center part in the width direction of the touch roll and the touch roll can be uniformly flexed.

The pressure to be given to the touch roll by the backup roll is not specifically defined, but is preferably such that the pressure to be given to the melt by the nip-pressing unit satisfies the above-mentioned preferred range. For example, the pressure by the backup roll is preferably from 20 to 500 MPa, more preferably from 25 to 400 MPa, even more preferably from 30 to 250 MPa. Pressing the touch roll by the pressure falling within the range makes it possible to sufficiently and uniformly flex the touch roll and further makes it possible to also uniformly flex the chill roll like the touch roll.

In the production method of the invention, the cross width of the backup roll is preferably shorter than the cross width of the touch roll from the viewpoint of controlling the flexing level of the touch roll.

In the production method of the invention, preferably, the melt of thermoplastic resin composition fed from the feeding means is kept warmed just before it is brought into contact with at least any one of the two rolls to thereby reduce the temperature fluctuation in the width direction; concretely, the temperature fluctuation in the width direction is preferably within 5° C. For reducing the temperature fluctuation, preferably, a member having a heat-insulating function or a heat-reflecting function is disposed in at least a part of the air gap to thereby shield the melt from fresh air. When such a heat-insulting member is disposed in the pathway in the manner as above to thereby shield the melt from fresh air, then the melt is protected from being exposed to the external environments such as air, and therefore the temperature fluctuation in the film in the width direction thereof can be reduced. The temperature fluctuation in the film melt in the width direction is preferably within ±3° C., more preferably within ±1° C.

Further, when the shielding member is used, then the film melt may be led to pass between the rolls while its temperature is high, or that is, while its melt viscosity is low, and the member is therefore effective for facilitating the film production in the invention.

The temperature profile of the film melt may be determined, using a contact thermometer or a non-contact thermometer.

For example, the shielding member may be disposed on the inner side than both edges of the two rolls and as spaced from the side in the width direction of the thermoplastic resin composition feeding means (e.g., die). The shielding plate may be fixed directly to the side of the feeding means, or may be fixed thereto as supported by a supporting member. The width of the shielding member is, for example, preferably the same as or longer than the width of the side of the feeding means in order to efficiently block the ascending air current to be generated by heat radiation by the feeding means.

The gap between the shielding member and the edge in the width direction of the film melt is preferably made narrow for efficiently blocking the ascending air current that runs along the roll surface, more preferably about 50 mm or so from the edge in the width direction of the film melt. Not always needed, the gap between the side surface of the feeding means and the shielding member is preferably such that the air current in the space surrounded by the shielding member could be discharged therethrough, for example, at most 10 mm.

As the material having a heat-insulating function and/or a heat-reflecting function, preferred is one excellent in air shieldability and heat retentiveness, and for example, preferred is a stainless or the like metal plate.

For further reducing the fluctuation of Re[0°], Re[+40°] and Re[−40°], there may be employed a method of increasing the adhesiveness of the film melt to the casting roll. Concretely, the adhesiveness may be increased by combining an electrostatic method, an air knife method, an air chamber method, a vacuum nozzle method and the like. The adhesiveness increasing technique may be applied to the entire surface of the film melt or may be to a part thereof.

After formed in the manner as above, the film is preferably cooled using at least one more casting roll in addition to the two rolls (for example, casting roll and chill roll) between which the filmy melt is led to pass. The touch roll is generally so arranged that it can be kept in touch with the first casting roll on the most upstream side (nearer to the thermoplastic resin composition feeding unit, for example, the die). In general, three chill rolls are employed; however, the invention is not limited to the mode. The distance between plural casting rolls is preferably from 0.3 mm to 300 mm in terms of the face-to-face distance therebetween, more preferably from 1 mm to 100 mm, even more preferably from 3 mm to 30 mm.

Preferably in the production method of the invention, the formed, nip-pressed film is trimmed on both sides thereof. Thus trimmed on both sides thereof, the side part of the film having a low Revalue may be cut off and the ratio of Re[0°] of the side to Re[0°] of the center of the thus-trimmed film can be controlled to be 0.5 or more.

The side width of the nip-pressed film to be trimmed away is preferably from 10 to 300 mm from each side of the film, more preferably from 20 to 200 mm from each side of the film. The side width of the film to be trimmed away may be suitably changed and defined in accordance with the distribution of Re[0°] of the produced film in the cross direction thereof, not contradictory to the spirit and the scope of the production method of the invention. The part trimmed away from the film may be recycled as a film-forming material.

Preferably, the film is knurled on one side or both sides thereof. The height of the knurl formed by the knurling treatment is preferably from 1 μm to 50 μm, more preferably from 3 μm to 20 μm. In the knurling treatment, a protrusion may be formed on one surface or both surfaces. The width of the knurl is preferably from 1 mm to 50 mm, more preferably from 3 mm to 30 mm. The knurling treatment may be carried out at room temperature to 300° C.

Also preferably, a laminate film is attached to one surface or both surfaces of the film before winding it. The thickness of the laminate film is preferably from 5 μm to 100 μm, more preferably from 10 μm to 50 μm. Not specifically defined, its material may be any of polyethylene, polyester, polypropylene, etc.

The tension for winding the film is preferably from 2 kg/m-width to 50 kg/m-width, more preferably from 5 kg/m-width to 30 kg/m-width.

The thickness of the unstretched film produced according to the production method of the invention is preferably at most 100 μm. For use in liquid crystal display devices and others, the thickness of the film is more preferably at most 80 μm from the viewpoint of display body thickness reduction, even more preferably at most 60 μm.

<Stretching>

The production method of the invention includes a step of stretching the nip-pressed film, as produced according to the process as above, in the direction differing from the film traveling direction with holding both edges of the film, in which the stretching is attained at a temperature falling within a range of from (Tg−40)° C. to (Tg+5)° C. In the production method of the invention, the nip-pressed film may be stretched after it is once wound up or not wound up. In the production method of the invention, the film may be stretched and/or relaxed. For example, the film may be processed according to the following process (a) to (g).

(a) Lateral stretching
(b) Lateral stretching→relaxation
(c) Longitudinal stretching
(d) Longitudinal stretching→relaxation
(e) Longitudinal (lateral) stretching→lateral (longitudinal) stretching
(f) Longitudinal (lateral) stretching→lateral (longitudinal) stretching→relaxation
(g) Lateral stretching→relaxation→longitudinal stretching→relaxation Of those, especially preferred are the process (a), lateral stretching.

(Lateral Stretching)

In the production method of the invention, a tenter may be used for lateral stretching. Specifically, while both sides of the nip-pressed film are held, the film is expanded in the direction differing from the film traveling direction and is thereby stretched. In this case, air at a predetermined temperature may be introduced into the tenter for controlling the stretching temperature. The stretching temperature is from (Tg−40)° C. to (Tg+5)° C.

The lateral stretching temperature is preferably from (Tg−30)° C. to Tg° C. When the lateral stretching temperature is from (Tg−30)° C. to Tg° C., then the γ expression level in the laterally-stretched film can be enhanced, and in addition, the part of the film having a largest birefringence level can be controlled to fall within a range of from 15% to 85% in the thickness direction of the film. As a result, the optical film obtained after the lateral stretching has the advantage in that, when the film is incorporated in a TN-mode liquid crystal display device, it is effective for enlarging the viewing angle of the device and for removing the peripheral unevenness thereof. More preferably, the lateral stretching temperature is from (Tg−30)° C. to (Tg−5)° C.

Preferably, the lateral draw ratio is from 1.05 to 3 times, more preferably from 1.1 to 2.6 times, even more preferably from 1.2 to 2.3 times.

(Lateral Stretching Mode)

In the production method of the invention, the film may be stretched in an oblique direction (hereinafter this may be referred to as "oblique stretching"), apart from the ordinary lateral stretching of stretching the film in the direction at 90° relative to the film traveling direction. The oblique stretching is as follows: Like in ordinary lateral stretching, the film is held by a pair of chucks, and while heated, it is expanded in the lateral direction; but in this case, the traveling speed of the right and left chucks is varied, or the tenter is bent like the shape of "V", or the length of the right and left chucks is varied (for example, the traveling route length of one chuck in the tenter is made longer), whereby the film can be stretched in the intended oblique direction. Accordingly, the film can be stretched in the direction deviated by from 30° to 150° from the machine direction (MD), more preferably by from 40° to 140°, even more preferably by from 45° to 135°. Concretely, the oblique stretching may be attained according to the methods described in the following patent publications:

JP-A 2002-22944, 2002-86554, 2004-325561, 2008-23775, 2008-110573, 2000-9912, 2003-342384, 2004-20701, 2004-258508, 2006-224618, 2006-255892, 2008-221834, 2003-342384, WO2003/102639, JP-A 2008-23775.

Preferably, the production method of the invention includes a step of preheating the nip-pressed film at a temperature of from (Tg−40)° C. to (Tg+3)° C., or that is, a step of leading the step to pass through a preheating zone, prior to the step of stretching the film in the direction differing from the film traveling direction, from the viewpoint of enhancing the uniformity of the lateral stretching. Preferably, the preheating temperature is from (Tg−40)° C. to (Tg+3)° C., more preferably from (Tg−40)° C. to Tg° C., even more preferably from (Tg−30)° C. to (Tg−7)° C.

Also preferably, the stretched film is subsequently led to pass through a thermal fixation zone, in which the thermal fixation temperature may be lower by from 1° C. to 50° C. than the stretching temperature, more preferably lower by from 2° C. to 40° C., even more preferably lower by from 3° C. to 30° C. Still more preferably, the thermal fixation temperature is not higher than the stretching temperature and not higher than Tg.

The length of the preheating zone, the stretching zone and the fixation zone may be suitably selected and defined; and the length of the preheating zone may be from 100 to 150% and the length of the fixation zone may be from 50 to 100% relative to the length of the stretching zone. Preferably, the preheating time is from 1 second to 10 minutes, more preferably from 2 seconds to 5 minutes, even more preferably from 5 seconds to 1 minute. Preferably, the stretching time is from 1 second to 5 minutes, more preferably from 2 seconds to 3 minutes, even more preferably from 5 seconds to 1 minute. Preferably, the thermal fixation time is from 1 second to 5 minutes, more preferably from 2 seconds to 3 minutes, even more preferably from 5 seconds to 1 minute. During the preheating, the tenter width is preferably kept nearly constant. The wording "nearly" is meant to indicate ±10% of the width of the unstretched film. In preheating and thermal fixation, preferably, the film is held with clips, or that is, it is desirable that the preheating, the stretching and the thermal fixation of the film are attained continuously.

Preferably in the production method of the invention, the nip-pressed film is stretched in a mode of ordinary lateral stretching in the direction of 90°±1° relative to the film traveling direction, from the viewpoint of simplifying the lateral stretching apparatus and preventing the axial misalignment in the method.

The slow axis misalignment of the optical film obtained after the stretching in the invention is preferably ±5°, more preferably ±3°, even more preferably ±1°, most preferably ±0.5°.

(Longitudinal Stretching)

The longitudinal stretching may be attained by leading the film to pass between two pairs of rolls under heat while the peripheral speed of the rolls on the outlet port side is made higher than that of the rolls on the inlet port side. In this stage, the retardation expressibility in the thickness direction of the film may be controlled by changing the distance (L) between the rolls and the width (W) of the unstretched film. When L/W (referred to as an aspect ratio) is from 2 to 50 (long-spun stretching), films having a small Rth are easy to produce; and when L/W is from 0.01 to 0.3 (short-spun stretching), then films having a large Rth may be produced. In this embodiment, any of long-spun stretching, short-spun stretching, stretching in the range between the two (middle stretching, L/W is from more than 0.3 to 2) may be employed; but preferred are long-spun stretching and short-spun stretching in which the alignment angle can be reduced. More preferably, the stretching modes are differentiated to the effect that short-spun stretching is employed for producing films having a high Rth, and long-spun stretching is employed for producing films having a low Rth.

The stretching temperature is preferably from (Tg−10)° C. to (Tg+60)° C., more preferably from (Tg−5)° C. to (Tg+45)° C., even more preferably from (Tg−10)° C. to (Tg+20)° C.

Also preferably, the longitudinal draw ratio is from 1.2 to 3.0 times, more preferably from 1.2 to 2.5 times, even more preferably from 1.2 to 2.0 times.

(Relaxation)

After stretched, the film may be further processed for relaxation to enhance the dimensional stability thereof. After the film formation, the thermal relaxation may be attained after any of longitudinal stretching or lateral stretching, but preferably every after the two. The relaxation may be attained on-line continuously after stretching, but may be off-line after the stretched film is wound up.

Preferably, the thermal relaxation is attained at from (Tg−30)° C. to (Tg+30)° C., more preferably from (Tg−30)° C. to (Tg+20)° C., even more preferably from (Tg−15)° C. to (Tg+10)° C., preferably for 1 seconds to 10 minutes, more preferably for 5 seconds to 4 minutes, even more preferably for 10 seconds to 2 minutes, while conveyed under tension of preferably from 0.1 kg/m to 20 kg/m, more preferably from 1 kg/m to 16 kg/m, even more preferably from 2 kg/m to 12 kg/m.

[Polarizer]

At least a polarizing element (hereinafter this may be referred to as "polarizing film") may be laminated on the film of the invention to produce a polarizer of the invention. The polarizer of the invention is described below. Examples of the polarizer of the invention include those produced for the purpose of two functions as a protective film and for viewing angle compensation on one surface of a polarizing film, and composite-type polarizers laminated on a protective film of TAC or the like.

The polarizer of the invention is not specifically defined in point of its constitution, and it may be any one comprising the film of the invention and a polarizing element. For example, in case where the polarizer of the invention comprises a polarizing element and two polarizer-protective films (transparent polymer films) for protecting both surfaces of the element, the film of the invention may be at least one of the polarizer-protective films. The polarizer of the invention may have an adhesive layer via which the polarizer is stuck to any other member. In the polarizer of the invention, when the surface of the film of the invention has a roughened structure, it may have an antiglare function. Also preferably, the polarizer of the invention may comprise an antireflection film of the invention produced by laminating an antireflection layer (low-refractivity layer) on the surface of the film of the invention, or on the optically-compensatory film of the invention produced by laminating an optically-anisotropic layer on the surface of the film of the invention.

In general, a liquid crystal display device comprises a liquid crystal cell disposed between two polarizers, which, therefore has four polarizer-protective films. The film of the invention may be any of those four polarizer-protective films, but preferably, the film is especially advantageously used as the protective film to be disposed between the liquid crystal cell and the polarizer in the liquid crystal display device.

More preferably, the polarizer of the invention has a constitution of a cellulose acylate film, a polarizing element and a film of the invention laminated in that order. Also preferred is a constitution of a cellulose acylate film, a polarizing element, a film of the invention and an adhesive layer laminated in that order.

(Optical Film)

As the optical film in the polarizer of the invention, used is the film of the invention. The film may be surface-treated. The surface treatment method includes, for example, corona discharge, glow discharge, UV irradiation, flame treatment, etc.

(Cellulose Acylate Film)

As the cellulose acylate film in the polarizer of the invention, used is any known cellulose acylate film for polarizer. For example, known triacetyl cellulose (TAC) films (e.g., FUJIFILM's Fujitac T-60) is preferred. The cellulose acylate film may be surface-treated. The surface treatment method includes, for example, saponification, etc.

(Polarizing Element)

As the polarizing element, for example, used is one produced by dipping a polyvinyl alcohol film in an iodine solution followed by stretching it.

Any one capable of attaining the intended object of the invention may be selected for the polarizing element for use in the invention. The polarizing element includes, for example, those produced by making a hydrophilic polymer film adsorb a dichroic substance such as iodine or dichroic dye followed by uniaxially stretching it; and polyene-based oriented films such as dehydrated polyvinyl alcohol films, dehydrochlorinated polyvinyl chloride films, etc. The hydrophilic polymer film includes, for example, polyvinyl alcohol films, partially formalized polyvinyl alcohol films, partially saponified ethylene/vinyl acetate copolymer films, etc. In the invention, preferred is a polarizing element produced by making a polyvinyl alcohol film adsorb iodine.

Preferably, the polarizing element further contains at least one of potassium and boron. Containing potassium and/or boron, the polarizing element may have a complex elastic modulus (Er) within a preferred range, and may have a high degree of polarization or may give a polarizer having a high degree of polarization. For producing the polarizing element containing at least one of potassium and boron, for example, the film to be the polarizing element may be dipped in at least one solution of potassium and boron. The solution may contain iodine.

For producing the polyvinyl alcohol film, any suitable working method is employable. The working method may be a known one. Commercial films may be directly used for the polyvinyl alcohol film. Commercial polyvinyl alcohol films include, for example, "Kuraray Vinylon Film" (Kuraray's trade name), "Tohcello Vinylon Film" (Tohcello's trade name), "Nichigo Vinylon Film" (Nippon Gohsei's trade name), etc.

One example of producing a polarizing element is described. For example, a polyvinyl alcohol-based polymer film (unprocessed film) is dipped in a swelling bath of pure water and in a dyeing bath of an aqueous iodine solution, in which the film is swollen and dyed under tension given thereto in the machine direction by rolls each running at a different speed. Next, the thus-swollen and dyed film is dipped in a crosslinking bath containing potassium iodine and is thus crosslinked and finally stretched under tension given thereto in the machine direction by rolls each running at a different speed. The crosslinked film is dipped in a water bath of pure water, as conveyed by rolls, and is thus rinsed with water. The rinsed film is then dried to have a controlled water content and wound up. In that manner, the polarizing element is produced by stretching the starting film, for example, by from 5 times to 7 times the original length thereof.

The polarizing element may be processed for surface modification in any desired manner, for enhancing its compatibility with adhesive. The surface modification treatment includes, for example, corona discharge, plasma discharge, glow discharge, flame treatment, ozone treatment, UV ozone treatment, UV treatment, etc. One or more of these treatments may be applied to the polarizing element either singly or as combined.

(Adhesive Layer)

The polarizer of the invention may have an adhesive layer as at least one outermost layer thereof (the polarizer of the type may be referred to as "adhesive polarizer"). In one preferred embodiment, an adhesive layer is provided on the surface of the polarizing element opposite to the surface thereof coated with the above-mentioned optical film, which is for facilitating adhesion of the polarizer to any other member such as any other optical film, liquid crystal cell, etc.

(Production Method for Polarizer)

A method for producing the polarizer of the invention is described.

The polarizer of the invention may be produced by sticking one surface (with surface treatment, if any) of a film of the invention to at least one surface of the above-mentioned polarizing element with an adhesive. In case where a cellulose acylate film, a polarizing element of the invention and a film of the invention are stuck together in that order to produce a polarizer of the invention, an adhesive may be applied to both surfaces of the polarizing element and the polarizing element may be stuck to the other films.

In the production method for the polarizer of the invention, preferably, the film of the invention is directly stuck to the polarizing element.

As the adhesive, any known adhesive for polarizer production may be used. The embodiment is also preferred where an adhesive layer is provided between the polarizing element and the film adjacent thereto. Examples of the adhesive include aqueous solution of polyvinyl alcohol or polyvinyl acetal (e.g., polyvinyl butyral), and latex of vinylic polymer (e.g., polybutyl acrylate). An aqueous solution of completely saponified polyvinyl alcohol is especially preferred for the adhesive. Preferably, the polyvinyl alcohol adhesive contains a polyvinyl alcohol resin and a crosslinking agent.

The production method for the polarizer of the invention is not limited to the above-mentioned methods, and any other methods are employable. For example, herein employable are the methods described in JP-A 2000-171635, 2003-215563, 2004-70296, 2005-189437, 2006-199788, 2006-215463, 2006-227090, 2006-243216, 2006-243681, 2006-259313, 2006-276574, 2006-316181, 2007-10756, 2007-128025, 2007-140092, 2007-171943, 2007-197703, 2007-316366, 2007-334307, 2008-20891. Of those, more preferred are the methods described in JP-A 2007-316366, 2008-20891.

Preferably, a protective film is stuck to the other surface of the polarizing film, and the protective film may be a film of the invention. Also usable are various films heretofore known as protective films for polarizers, such as cellulose acylate films, cyclic polyolefin polymer films, etc.

Thus produced, the polarizer of the invention is preferably used in a liquid crystal display device, in which the polarizer may be on any side of the viewing side or the backlight side of the liquid crystal cell, or may be on both sides thereof with no limitation. Specific examples of image-display devices to which the polarizer of the invention is applicable include self-emitting display devices such as electroluminescent (EL) displays, plasma displays (PD), field emission displays (FED). The liquid crystal display device to which the polarizer is applicable includes transmission-type liquid crystal display devices and reflection-type liquid crystal display devices.

[Liquid Crystal Display Device]

The film and the polarizer of the invention may be used in various modes of liquid crystal display devices. Preferably, they are used in TN (twisted nematic), OCB (optically compensatory bend) or ECB (electrically controlled birefringence) mode liquid crystal display devices, more preferably in TN-mode liquid crystal display devices.

[Optical Compensatory Film]

Preferably, the film of the invention is used as an optical film. The film is more preferred for an optical compensatory film.

<Laminate Film>

Preferably, the film of the invention is a single-layer film from the viewpoint of the ability to omit a step of film lamination and of the ability to inhibit light reflection on the laminate interface; however, a functional layer may be laminated on the film of the invention to give a laminate film. In case where the film of the invention is a laminate film comprising 2 or more layers, it is desirable that all the layers do not contain a polymerizing liquid crystal compound from the viewpoint of reducing the degree of polarization index of the film.

An optically-anisotropic layer may be laminated on the film of the invention to give a laminate film. The optically-anisotropic layer usable in the invention is not specifically defined. For example, herein usable are those described in JP-A2001-328973, [0008] to [0034], JP-A2006-227630 [0017], JP-A 2007-248780, [0014] to [0097].

EXAMPLES

The invention is described more concretely with reference to the following Examples, in which the material, the reagent and the substance used, their amount and ratio, and the details of the treatment may be suitably modified or changed not overstepping the spirit and the scope of the invention. Accordingly, the invention should not be limited to the Examples mentioned below.

<Measurement Method>

(Slow Axis Direction, Tilt Direction, Re[0°], Re[40°], γ, Side Re[0°]/Center Re[0°])

Using KOBRA, the film slow axis direction and the film tilt direction were measured. Subsequently, the angle between the slow axis direction and the tilt direction was computed, and the results are shown in Table 1 and Table 2 below. Next, the film was sampled at indefinite 10 points spaced from each other by at least 2 mm in the center part thereof, and according to the method mentioned in the above, the retardation of each sample was measured in the film normal line direction, in the direction tilted by 40° toward the tilt direction from the film normal line, and in the direction tilted by −40° from the film normal line. From the thus-found data Re[40°] and Re[−40°], the value γ was computed according to the above-mentioned definition. The mean data of Re[40'], Re[−40°] and γ are shown in Table 1 and Table 2. Re[0°] means the center Re[0°]. As for the films with no tilt direction (γ=0 nm), the optical properties of the films were measured and computed based on the film lengthwise direction (film traveling direction) taken as the tilt axis.

Next, the film was sampled at indefinite 10 points spaced from each other by at least 2 mm in the side part thereof, and the retardation of each sample was measured from the film normal line direction. This is the side Re[0°] of the film. The ratio of side Re[0°]/center Re[0°] of the film was computed, and the data are shown in Table 1 and Table 2.

In addition, the film was checked as to whether or not the tilt direction thereof could be the same as the film traveling direction. Further, the film was sampled at indefinite 10 points spaced from each other by at least 2 mm in the side part thereof, and the slow axis angle of each sample was measured. The difference between the maximum angle and the minimum angle was computed as the slow axis misalignment.

(Extinction Position)

This was measured according to the method mentioned above. Briefly, a sliced section of a film was checked for the extinction position thereof by rotating it at intervals of 1° within a range of from 0° to 90°, using a polarization microscope (Nikon's Eclipse E600POL). The polarization microscope picture thus taken was divided into 20 in the film thickness direction, and sequentially separated into layers from one surface of the film, and the individual layers were analyzed.

(Birefringence Change in Thickness Direction, Position of Maximum Birefringence)

Twenty cross sections, as divided in the thickness direction of the polarization microscope picture of the sliced section of a film taken in the above for measurement of the extinction position of the film, were compared with an interference color chart, and the birefringence of each cross section was measured. The position of the layer of the sample having the maximum birefringence is shown in Table 2. The difference between the maximum birefringence and the minimum birefringence of the film sample in the cross-sectional direction of the film was computed.

(Curl)

The film was blanked into a sample piece having a size of 2 mm×35 mm in MD×TD. The sample having a 35-mm side in MD is referred to as "MD sample" and that having a 35-mm side in TD as "TD sample".

At the point of the film divided in 10 equal sections in the lateral direction, one MD sample and one TD sample were cut out.

The MD sample and the TD sample were individually set on the curl plate described in "ANSI/ASCPH1.29-1985", and conditioned in humidity at 25° C. and at a relative humidity of 60% or less for one hour, and the absolute value of the curl of the sample was measured. The curl is represented by the reciprocal of the radius of curvature (m).

Of the mean value of the 10 MD samples and the mean value of the 10 TD samples, the larger one is taken as the curl of the film, and shown in Table 2.

(Temporal Change Rate of γ)

According to the method mentioned below, the formed film was aged in an environment at 40° C. and at a relative humidity of 90% for 500 hours, and its γ before and after aging was measured. The temporal change rate of γ was computed according to the following formula:

(Temporal Change Rate of γ)=100%×(absolute value of the difference of γ before and after aging)/(γ before aging).

Thus computed, the temporal change rage of γ is shown in Table 2 below.

Production Example 1

Production of Norbornene Resin (COC, Addition Polymer) Pellets

Used were pellets of Polyplastics' "TOPAS #6013" as the norbornene resin (COC, addition polymer). "TOPAS #6013" has an inherent positive birefringence. The glass transition point of the resin was 130° C.

Production Example 2

Preparation of Norbornene Resin (COP, Ring-Opening Polymerization Polymer) Pellets A norbornene resin (COP, ring-opening polymerization polymer) was produced according to the method described in Example 1 in WO98/14499, and this was pelletized in an ordinary manner. The glass transition point of the resin was 136° C.

Production Example 3

Production of Polycarbonate (PC) Pellets

Polycarbonate pellets of Idemitsu Kosan's "Toughlon MD1500" were used. "Toughlon MD1500" has an inherent positive birefringence. The glass transition point of the resin was 142° C.

Production Example 4

Production of Acrylic Resin Pellets

According to Production Example 1 in paragraphs [0222] to [0224] in JP-A 2008-9378, an acrylic compound was produced from 7500 g of methyl methacrylate and 2500 g of methyl 2-(hydroxymethyl)acrylate. The compound had a degree of lactonation of 98%, and a glass transition point of 134° C.

Production Example 5

Production of Cellulose Acylate Resin (CAP-1) Pellets

Cellulose acetate propionate (CAP-1) was produced according to the method of Example 1 in JP-A 2008-87398, and this was pelletized according to an ordinary method. As for the composition of CAP-1 used here, the degree of acetylation of the resin was 1.95, the degree of propionylation thereof was 0.7, the total degree of acylation thereof was 2.65. The glass transition point of the resin was 174° C.

Production Example 6

Production of Cellulose Acylate Resin (CAP-2) Pellets

Cellulose acetate propionate (CAP-2) was produced according to the method of Example 101 in JP-A 2008-50562, and this was pelletized according to an ordinary method. As for the composition of CAP-2 used here, the degree of acetylation of the resin was 0.15, the degree of propionylation thereof was 2.55, the total degree of acylation thereof was 2.70. The glass transition point of the resin was 137° C.

Example 1

Production of Film (Film Formation)
Pellets of a thermoplastic resin, cyclic olefin copolymer TOPAS #6013 (COC) as in Table 1 below were used. The pellets were dried at 100° C. for at least 2 hours, melted at 260° C., and kneaded and extruded using a single-screw kneading extruder. A screen filter, a gear pump and a leaf disc filter were arranged in that order between the extruder and the die, and these were connected to each other via a melt line duct. The melt was extruded out at the extrusion temperature (melt temperature) shown in Table 1 below, via a die having a width of 1300 mm and a lip gap of 0.8 mm.

Subsequently, the melt resin was extruded out in the center of a part nip-pressed between a casting roll and a touch roll. The cylinder of the hard chromium-plated stainless casting roll (chill roll) having a width of 1500 mm and a diameter of 300 mm on the most upstream side was so controlled that the touch pressure could be as in Table 1 below, and a hard chromium-plated, stepped stainless touch roll having a width of 1500 mm and a diameter of 200 mm was kept in contact with it. Precisely, the stepped rigid crown roll was so designed as to have a step having a depth of 0.3 mm at 200 mm from both sides of the roll. In other words, the roll had a non-contact width of 200 mm on each side of the melt. The touch roll used here was crown-worked in consideration of the roll flexing, and the touch roll crown level is shown in Table 1 below.

Further, a backup roll having a width of 1300 mm and a diameter of 350 mm and having a Shore A hardness of 70, which was formed of iron steel core+heat-resistant NBR rubber (rubber cover thickness, 10 mm), was fitted to the nip-pressing unit. Using a pressure-sensitive sheet, the backup roll was fitted in such a manner that the roll linear pressure could be uniform, and the backup roll was driven to push the touch roll with regulating the digital pressure.

The touch pressure was measured was measured by placing a middle-pressure prescale (by FUJIFILM) between the two rolls under no melt therebetween, with the two rolls kept driving at the same peripheral speed of 5 m/min at 25° C., and the found value was taken as the pressure to be given to the melt in film formation, and this is shown in Table 1.

The touch roll and the chill roll both had a Shore hardness of 70 HS. The melt was landed on the center part sandwiched between the casting roll and the touch roll. These rolls were used, and the peripheral speed of the touch roll was made higher than the peripheral speed of the chill roll. The peripheral speed of each roll and the peripheral speed ratio of the rolls are set under the condition shown in Table 1 below, and the distance between the die and the melt landing point was set to be 50 mm for film formation. The temperature of the touch roll was Tg–5° C.; and the temperature of the chill roll was Tg–10° C. The atmosphere in film formation was at 25° C. and at a relative humidity of 60%. A wind shield was arranged between the die and the touch roll (or chill roll), and the melt was kept warmed during film formation.

Subsequently and just before wound up, the film was trimmed on both sides thereof to the width shown in Table 1 below, and then knurled on both sides thereof to a width of 50 mm and a height of 20 μm. After trimmed, the width of the film was 1 m, and the film was wound up to a length of 450 m, thereby producing an unstretched film (nip-pressed film) of Example 1.
(Stretching)
The nip-pressed film produced in the above was laterally stretched under the condition shown in Table 1. The unstretched (nip-pressed) film was held by clips on both sides thereof in such a manner the film surface that had been on the touch roll side in film formation was on the downside. The stretching mode, the draw ratio in stretching, the preheating temperature and the lateral stretching temperature in this stage of stretching with a tenter were as in Table 1 below. The film traveling speed was 12 m/min, and the stretching speed was 200%/min. The stretching mode was ordinary lateral stretching as described below. In the lateral stretching step, the blowing air temperature on both sides of the tenter was suitably so controlled that the film surface temperature could be the lateral stretching temperature as in Table 1 below.

The ordinary lateral stretching mode is the method described in JP-A 10-249934.

Examples 2 to 19

Comparative Examples 1 to 4

Films of Examples and Comparative Examples were produced in the same manner as in Example 1, for which, however, the resin, and the conditions in the melt film formation step, the nip-pressing step and the lateral stretching step were changed to those shown in Table 1 below. The properties of the unstretched films and the stretched films of Examples and Comparative Examples are shown in Table 1 and Table 2 below.

(Production of Polarizer)

Using the film of Examples and Comparative Examples, a polarizer was produced. Concretely, first, a polyvinyl alcohol (PVA) film having a thickness of 80 μm was dipped and dyed in an aqueous iodine solution (30° C.) having an iodine concentration of 0.05% by mass and a KI concentration of 3% by mass, for 60 seconds, and then while dipped in an aqueous solution (55° C.) having a boric acid concentration of 4% by mass and a KI concentration of 3.5% by mass for 60 seconds, this was longitudinally stretched by 5.5 times the original length, and then dried at 50° C. for 4 minutes to give a polarizing element having a thickness of 20 μm.

Apart from this, a TAC film (by FUJIFILM) having a thickness of 60 μm was used as a protective film B for the polarizing element. The film was dipped and saponified in an aqueous sodium hydroxide solution having a concentration of 2.0 mol/L at 55° C., and then fully washed with water to remove sodium hydroxide. Subsequently, this was dipped in an aqueous diluted sulfuric acid solution having a concentration of 0.005 mol/L at 35° C. for 1 minute, then fully washed with water to remove the aqueous diluted sulfuric acid solution, and thereafter dried at 105° C.

The surface of the laterally-stretched film of Example 1 was processed for corona discharge treatment so as to have a contact angle of at most 30°, and this was used as a protective film A for the polarizing element.

The laterally-stretched film of Example 1, which has been processed for corona discharge treatment, and the above saponified TAC film having a thickness of 60 μm were disposed on both sides of the above-mentioned, dyed and stretched polarizing element film, and using a polyvinyl alcohol adhesive, these were stuck to the polarizing element directly on line in a mode of roll-to-roll operation. After dried, this was rolled up to give a roll of polarizer. Using the films of the other Examples and Comparative Examples, polarizers were produced in the same manner as above.

(Production of TN-Mode Liquid Crystal Display Device)

The pair of polarizers (upper polarizer and lower polarizer) were peeled off from a 22-inch liquid crystal display device having a TN-mode liquid crystal cell (ACER's AL2216W), and in place of these, the polarizers produced in the above were stuck to the liquid crystal cell, one to the viewers' side and another one to the backlight side, both with an adhesive in such a manner that the film of Examples 1 to 19 and Comparative Examples 2 to 4 could face the liquid crystal cell. In that manner, a liquid crystal display device as in FIG. 1 was produced. In the device, the two polarizers were so arranged that the transmission axis of the polarizer on the viewers' side (upper polarizer) could be perpendicular to the transmission axis of the polarizer on the backlight side (lower polarizer).

(Viewing Angle)

Next, the liquid crystal display device was left in a room at room temperature and at ordinary humidity (25° C., relative humidity of 60%) for 1 week, and tested using a tester (EZ-Contrast 160D, by ELDIM). The device was evaluated for the color expression and the contrast ratio (transmittance at the time of white level of display/transmittance at the time of black level of display) in 8 stages from the black level of display (L0) to the white level of display (L7). The test results are shown in the Table shown below.

In the Table shown below, ΔCu'v' means the distance from the trajectory on the u'v' space (u'v': chromatic coordinate in CIELAB space) in a case where the field of view was tilted to a polar angle of 60° on the basis of the panel front to u'v' at the point most spaced from the u'v' value on the front (normal line direction to the panel surface).

The contrast is a value computed from transmittance at the time of white level of display/transmittance at the time of black level of display. The contrast viewing angle indicates the polar angle range in which the contrast ratio is at least 10 with no gradation reversal.

The viewing angle of the TN-mode liquid crystal display device produced according to the method as above was measured, and the device was evaluated on the basis of the standards mentioned below. The results are shown in Table 2.

A: ΔCu'v' is from more than 0.02 to 0.04, and the contrast viewing angle is from more than 340° to 360° on both the vertical direction and the horizontal direction.

B: ΔCu'v' is from more than 0.04 to 0.06, and the contrast viewing angle is from more than 320° to 340° on both the vertical direction and the horizontal direction.

C: ΔCu'v' is from more than 0.06 to 0.08, and the contrast viewing angle is from more than 300° to 320° on both the vertical direction and the horizontal direction.

D: ΔCu'v' is from more than 0.08 to 0.10, and the contrast viewing angle is from more than 280° to 300° on both the vertical direction and the horizontal direction.

(Peripheral Unevenness)

The produced TN-mode liquid crystal display device was checked for peripheral unevenness thereof according to the method mentioned below, and the device was evaluated according to the standards mentioned below. The results are shown in Table 2 below.

The liquid crystal display device was left at room temperature and at ordinary humidity (25° C., relative humidity of 60%) for 24 hours, and driven for black display. The viewing angle to the device was tilted up to a polar angle of 60° based on the plane front, and in this state, the light leakage from the panel periphery was determined and the device was evaluated according to the standards mentioned below.

In addition, the device was tested in a durability test at a temperature of 40° C. and a relative humidity of 90% for 500 hours; and the ratio of the area of the light leakage around the periphery of the display panel (frame-like display unevenness) to the total area of the display panel was computed.

A: No light leakage was seen at room temperature and ordinary humidity; and the ratio of the area of peripheral unevenness after wet heat aging was less than 3%.

B: Slight light leakage was seen at room temperature and ordinary humidity; and the ratio of the area of peripheral unevenness after wet heat aging was from more than 3% to less than 10%.

C: Distinct light leakage was seen at room temperature and ordinary humidity; and the ratio of the area of peripheral unevenness after wet heat aging was from more than 10% to less than 20%.

D: Extremely intense light leakage was seen at room temperature and ordinary humidity; and the ratio of the area of peripheral unevenness after wet heat aging was 20% or more.

TABLE 1

| | | Melt Film Formation, Nip-Pressing Step | | | | | | |
|---|---|---|---|---|---|---|---|---|
| | Resin | Pressure (MPa) | Melt Temperature (° C.) | Touch Roll Speed (m/min) | Chill Roll Speed (m/min) | Peripheral Speed Ratio | Touch Roll Crown Level (μm) | Slit Width (cm) |
| Example 1 | COC | 70 | 260 | 10.5 | 10.0 | 0.95 | 80 | 5 |
| Example 2 | COC | 70 | 260 | 10.5 | 10.0 | 0.95 | 80 | 5 |
| Example 3 | COC | 70 | 260 | 10.5 | 10.0 | 0.95 | 80 | 5 |
| Example 4 | COC | 70 | 260 | 10.5 | 10.0 | 0.95 | 80 | 5 |
| Comparative Example 1 | COC | 70 | 260 | 10.5 | 10.0 | 0.95 | 80 | 5 |
| Comparative Example 2 | COC | 70 | 260 | 10.5 | 10.0 | 0.95 | 80 | 5 |
| Comparative Example 3 | COC | 70 | 260 | 10.5 | 10.0 | 0.95 | 80 | 5 |
| Comparative Example 4 | COC | 70 | 260 | 10.0 | 10.0 | 1.00 | 80 | 5 |
| Example 5 | COC | 20 | 260 | 10.5 | 10.0 | 0.95 | 80 | 5 |
| Example 6 | COC | 150 | 260 | 10.5 | 10.0 | 0.95 | 80 | 5 |
| Example 7 | COC | 300 | 260 | 10.5 | 10.0 | 0.95 | 80 | 5 |
| Example 8 | COC | 70 | 260 | 5.3 | 4.8 | 0.91 | 80 | 5 |
| Example 9 | COC | 70 | 260 | 5.3 | 5.2 | 0.98 | 80 | 5 |
| Example 10 | COC | 70 | 260 | 10.5 | 10.0 | 0.95 | 120 | 10 |
| Example 11 | COC | 70 | 260 | 10.5 | 10.0 | 0.95 | 120 | 8 |
| Example 12 | COC | 70 | 260 | 10.5 | 10.0 | 0.95 | 120 | 6 |
| Example 13 | COP | 50 | 265 | 10.5 | 10.0 | 0.95 | 200 | 10 |
| Example 14 | COP | 50 | 265 | 10.5 | 10.0 | 0.95 | 200 | 10 |
| Example 15 | COP | 50 | 265 | 10.5 | 10.0 | 0.95 | 200 | 10 |
| Example 16 | PC | 10 | 270 | 21.0 | 20.0 | 0.95 | 350 | 5 |
| Example 17 | CAP1 | 100 | 235 | 5.3 | 5.0 | 0.94 | 60 | 5 |
| Example 18 | CAP2 | 100 | 230 | 5.3 | 5.0 | 0.94 | 60 | 5 |
| Example 19 | acryl | 150 | 265 | 5.3 | 4.8 | 0.91 | 40 | 6 |

| | Physical Properties of Unstretched Film | | | | Stretching Step | | | |
|---|---|---|---|---|---|---|---|---|
| | Re [0°] (nm) | Re [40°] (nm) | Re [−40°] (nm) | side Re [0°]/center Re [0°] | Stretching Mode | Draw Ratio in Stretching | Preheating Temperature (° C.) | Lateral Stretching Temperature (° C.) |
| Example 1 | 86 | 143 | 8 | 0.98 | lateral stretching | 1.25 | Tg−5 | Tg−3 |
| Example 2 | 86 | 143 | 8 | 0.98 | lateral stretching | 1.25 | Tg−5 | Tg−40 |
| Example 3 | 86 | 143 | 8 | 0.98 | lateral stretching | 1.25 | Tg−5 | Tg |
| Example 4 | 86 | 143 | 8 | 0.98 | lateral stretching | 1.25 | Tg−5 | Tg+5 |
| Comparative Example 1 | 86 | 143 | 8 | 0.98 | lateral stretching | 1.25 | Tg−5 | Tg−45 |
| Comparative Example 2 | 86 | 143 | 8 | 0.98 | lateral stretching | 1.25 | Tg−5 | Tg+10 |
| Comparative Example 3 | 86 | 143 | 8 | 0.98 | vertical stretching | 1.25 | Tg−5 | Tg−3 |
| Comparative Example 4 | 71 | 59 | 59 | 0.98 | lateral stretching | 1.25 | Tg−5 | Tg−3 |
| Example 5 | 42 | 55 | 18 | 0.98 | lateral stretching | 1.25 | Tg−5 | Tg−3 |
| Example 6 | 93 | 171 | −1 | 0.98 | lateral stretching | 1.25 | Tg−5 | Tg−3 |
| Example 7 | 98 | 198 | −13 | 0.98 | lateral stretching | 1.25 | Tg−5 | Tg−3 |
| Example 8 | 89 | 157 | 0 | 0.98 | lateral stretching | 1.25 | Tg−5 | Tg−3 |
| Example 9 | 105 | 188 | 2 | 0.98 | lateral stretching | 1.25 | Tg−5 | Tg−3 |
| Example 10 | 96 | 146 | 20 | 0.99 | lateral stretching | 1.25 | Tg−5 | Tg−3 |
| Example 11 | 96 | 146 | 20 | 0.94 | lateral stretching | 1.25 | Tg−5 | Tg−3 |
| Example 12 | 96 | 146 | 20 | 0.80 | lateral stretching | 1.25 | Tg−5 | Tg−3 |
| Example 13 | 80 | 123 | 14 | 0.95 | lateral stretching | 1.35 | Tg | Tg |
| Example 14 | 80 | 123 | 14 | 0.95 | lateral stretching | 1.35 | Tg | Tg−10 |
| Example 15 | 80 | 123 | 14 | 0.95 | lateral stretching | 1.35 | Tg | Tg+5 |
| Example 16 | 165 | 355 | −60 | 0.98 | lateral stretching | 1.15 | Tg | Tg+5 |
| Example 17 | 57 | 88 | 13 | 0.98 | lateral stretching | 1.4 | Tg−8 | Tg−5 |
| Example 18 | 62 | 94 | 16 | 0.98 | lateral stretching | 1.4 | Tg−8 | Tg−5 |
| Example 19 | 20 | 33 | 4 | 0.97 | lateral stretching | 1.05 | Tg−10 | Tg−5 |

TABLE 2

Physical Properties of Stretched Film

| | Thickness (μm) | slow axis direction | tilt direction | angle between slow axis direction and tilt direction (°) | Re [0°] (nm) | Re [40°] (nm) | γ (nm) | side Re [0°]/ center Re [0°] | birefringence chance in thickness direction |
|---|---|---|---|---|---|---|---|---|---|
| Example 1 | 60 | TD | MD | 90 | 62 | 110 | 129 | 1.00 | yes |
| Example 2 | 60 | TD | MD | 90 | 81 | 148 | 169 | 1.00 | yes |
| Example 3 | 60 | TD | MD | 90 | 74 | 124 | 139 | 1.00 | yes |
| Example 4 | 60 | TD | MD | 90 | 68 | 92 | 85 | 1.00 | yes |
| Comparative Example 1 | | | | As broken, this was unstretchable. | | | | | |
| Comparative Example 2 | 60 | TD | MD | 90 | 37 | 30 | 9 | 1.00 | no |
| Comparative Example 3 | 60 | MD | MD | 0 | 114 | 184 | 169 | 0.95 | yes |
| Comparative Example 4 | 60 | TD | no | — | 102 | 86 | 0 | No tilt direction. | |
| Example 5 | 60 | TD | MD | 90 | 57 | 68 | 51 | 1.00 | yes |
| Example 6 | 60 | TD | MD | 90 | 41 | 87 | 113 | 1.00 | yes |
| Example 7 | 60 | TD | MD | 90 | 28 | 69 | 96 | 1.00 | yes |
| Example 8 | 60 | TD | MD | 90 | 49 | 93 | 112 | 0.99 | yes |
| Example 9 | 60 | TD | MD | 90 | 38 | 71 | 78 | 1.00 | yes |
| Example 10 | 60 | TD | MD | 90 | 62 | 109 | 128 | 0.99 | yes |
| Example 11 | 60 | TD | MD | 90 | 58 | 105 | 126 | 0.96 | yes |
| Example 12 | 60 | TD | MD | 90 | 61 | 108 | 126 | 0.92 | yes |
| Example 13 | 50 | TD | MD | 90 | 69 | 104 | 109 | 0.99 | yes |
| Example 14 | 50 | TD | MD | 90 | 93 | 154 | 175 | 0.99 | yes |
| Example 15 | 50 | TD | MD | 90 | 71 | 96 | 96 | 0.99 | yes |
| Example 16 | 40 | TD | MD | 90 | 90 | 165 | 215 | 0.97 | yes |
| Example 17 | 80 | TD | MD | 90 | 62 | 99 | 112 | 0.97 | yes |
| Example 18 | 80 | TD | MD | 90 | 61 | 94 | 106 | 0.97 | yes |
| Example 19 | 55 | TD | MD | 90 | 29 | 39 | 32 | 0.97 | yes |

Physical Properties of Stretched Film

| | position of maximum birefringence (°) | maximum extinction position (°) | minimum extinction position (°) | curl (m$^{-1}$) | temporal change rate of γ (%) | TN Panel Display Performance | |
|---|---|---|---|---|---|---|---|
| | | | | | | viewing angle | peripheral unevenness |
| Example 1 | 30 | 78 | 3 | 3 | 3 | A | A |
| Example 2 | 35 | 82 | 2 | 8 | 2 | A | A |
| Example 3 | 32 | 79 | 1 | 5 | 4 | A | A |
| Example 4 | 10 | 80 | 75 | 15 | 5 | B | B |
| Comparative Example 1 | | | As broken, this was unstretchable. | | | | |
| Comparative Example 2 | no | 60 | 60 | 34 | 25 | C | D |
| Comparative Example 3 | 35 | 82 | 0 | 60 | 18 | D | D |
| Comparative Example 4 | | No tilt direction. | | | | D | D |
| Example 5 | 90 | 82 | 4 | 3 | 8 | A | B |
| Example 6 | 50 | 85 | 9 | 6 | 2 | A | A |
| Example 7 | 45 | 86 | 3 | 10 | 1 | A | A |
| Example 8 | 57 | 78 | 3 | 5 | 6 | A | A |
| Example 9 | 60 | 60 | 4 | 4 | 6 | A | A |
| Example 10 | 35 | 84 | 5 | 10 | 5 | A | A |
| Example 11 | 36 | 85 | 6 | 8 | 8 | A | B |
| Example 12 | 35 | 80 | 6 | 6 | 10 | A | B |
| Example 13 | 45 | 70 | 10 | 5 | 3 | A | A |
| Example 14 | 45 | 70 | 12 | 4 | 2 | A | A |
| Example 15 | 10 | 70 | 65 | 17 | 8 | B | B |
| Example 16 | 91 | 75 | 71 | 12 | 12 | B | B |
| Example 17 | 46 | 65 | 9 | 4 | 3 | A | A |
| Example 18 | 50 | 68 | 11 | 2 | 4 | A | A |
| Example 19 | 12 | 76 | 16 | 9 | 8 | A | A |

From Table 1 and Table 2, it is known that, when the optical film of Examples 1 to 19 is used, then the viewing angle of the TN-mode liquid crystal display device comprising the film is enlarged and the problem of peripheral unevenness of the display panel is solved. In addition, it is known that the tilt direction in the film corresponds to the film traveling direction.

A pressure of 5 MPa was given to the melt in the nip-pressing unit, and the obtained film curled little and the temporal stability of γ of the film was good. When the film was incorporated in a TN-mode liquid crystal display device, its viewing angle was enlarged more and the peripheral unevenness of the display panel was removed more than in the device comprising a film produced according to a conventional method; however, the whole area of the panel of the device tended to exhibit uneven display.

(Electromicroscopic Photograph of Cross Section of Film)

Figure 2:
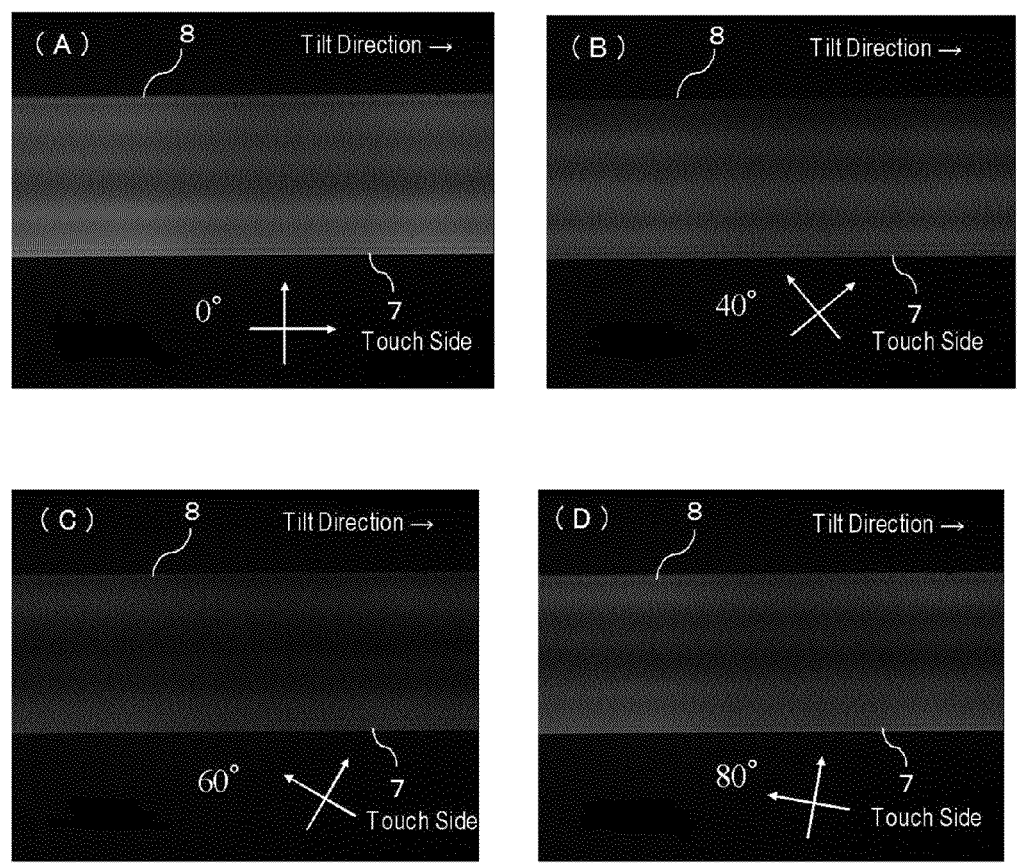
FIG. 2 shows polarization microscopic photographs of a film in a crossed Nicols configuration; and (A) to (D) are outline views showing the extinction positions of the film of Example 1 rotated by 0°, 40°, 60° and 80°, respectively.

In Example 1, the two polarizers were rotated by 0°, 40°, 60° or 80°; and the sliced section of the film was photographed through a polarization microscope (Nikon's Eclipse E600POL), and the data are in FIG. 2 (A) to (D).

From FIG. 2, it is known that, in the laterally-stretched film of the invention, the in-plane slow axis direction differs from the film tilt direction, and the birefringence of the sliced section of the film containing the tilt direction and the thickness direction in the plane thereof varies in the thickness direction of the film.

(Extinction Position of Film)

Figure 3:
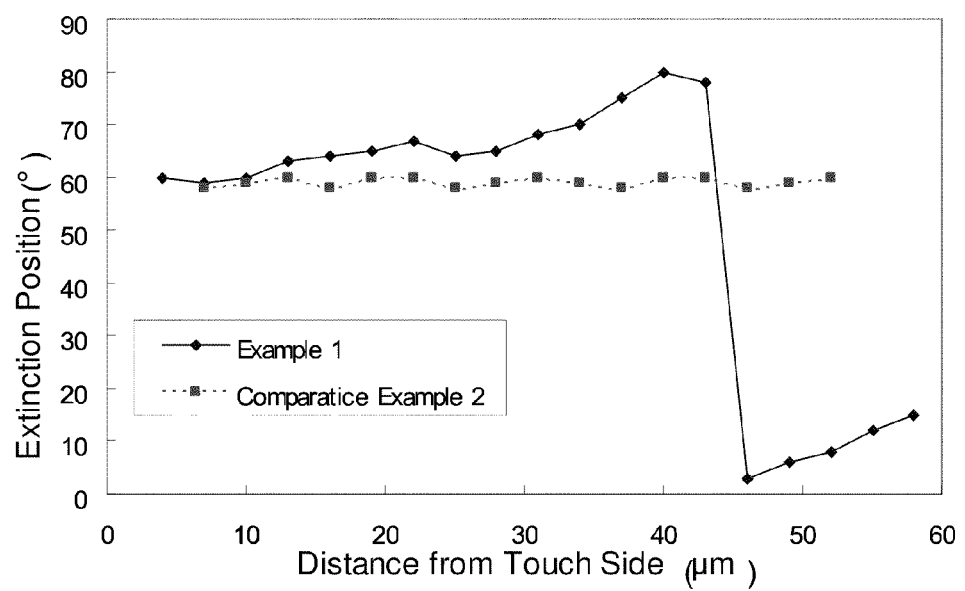
FIG. 3 is a graph showing the relationship between the distance in the film thickness direction from the side (touch side) of the film kept in touch with the touch roll in Example 1 and Comparative Example 2, and the extinction position in the film.

The sliced section of the film of Example 1 and Comparative Example 2 was analyzed through a polarization microscope (Nikon's Eclipse E600POL) for the extinction position therein by rotating the film section from 0° to 90° at intervals of 1°. The polarization microscopic images thus taken were individually divided into 20 sections in the thickness direction, and these are separated into layers sequentially from the surface of one side. FIG. 3 shows the relationship between the distance in the thickness direction from the side of the film that had been kept in touch with the first nip-pressing surface (touch roll) driven at a higher running speed (lower surface of the film in FIG. 2), and the extinction position in the film according to the Example 1. As known from FIG. 3, the film of the invention has a particular internal structure in which the extinction position varies in the thickness direction thereof. From FIG. 3, it is also known that in the film of the invention, the extinction position drastically varies in the distance of from 40 to 50 μm from the lower surface of the film.

From the above, it is known that the film produced according to the production method of the invention, where the film is biaxially stretched at a temperature falling within a specific temperature range with imparting a peripheral speed difference to the two rolls between which the film is stretched, is, when incorporated in a TN-mode liquid crystal display device, effective for optical compensation especially for enlarging the viewing angle and for removing peripheral unevenness in display.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 228741/2009, filed on Sep. 30, 2009, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical film comprising a thermoplastic resin, which is such that the slow axis direction in the film plane differs from the film tilt direction and the birefringence of a sliced section of the film that contains the tilt direction and the thickness direction in the plane varies in the thickness direction of the film.

2. The optical film according to claim 1, which is such that the angle between the slow axis direction in the film plane and the film tilt direction is within a range of from 89° to 91°.

3. The optical film according to claim 1, which is such that, when the sliced section of the film is analyzed sequentially from one end to the other end in the thickness direction of the film, then the part having a largest birefringence exists in the region of from 10% to 90% length from one side in the thickness direction of the film.

4. The optical film according to claim 1, which is such that, when the sliced section of the film is placed between two polarizers set in a crossed Nicols configuration, and when the sliced section is rotated within a range of from 0° to 90° while irradiated with light in the direction perpendicular to the polarizer plane, then the detected extinction position varies depending on the distance from one end of the sliced section in the thickness direction of the film, and plural extinction positions are detected at different angles within a range of from 1° to 90°.

5. The optical film according to claim 4, which is such that, when the sliced section of the film is analyzed sequentially from one end to the other end in the thickness direction thereof, then the difference between the maximum extinction position and the minimum extinction position is more than 5°.

6. The optical film according to claim 1, which satisfies the following formulae (I) and (II) wherein Re[0°] means the retardation measured in the normal direction of the film at a wavelength of 550 nm, Re[+40°] means the retardation measured in the direction tilted by 40° from the normal line to the tilt direction and Re[−40°] means the retardation measured in the direction tilted by −40° from the normal line to the tilt direction:

$$20 nm \leq Re[0°] \leq 300 nm \quad (I)$$

$$10 nm \leq \gamma \leq 300 nm \quad (II)$$

$$\gamma = |Re[+40°] - Re[-40°]| \quad (III)$$

7. The optical film according to claim 6, which satisfies the following formula (II') wherein Re[+40°] means the retardation measured in the direction tilted by 40° from the normal line of the film to the tilt direction and Re[−40°] means the retardation measured in the direction tilted by −40° from the normal line to the tilt direction:

$$20 nm \leq \gamma \leq 210 nm \quad (II')$$

$$\gamma = |Re[+40°] - Re[-40°]| \quad (III).$$

8. The optical film according to claim 1, wherein the thermoplastic resin is at least one selected from cyclic olefin resins, cellulose acylate resins, polycarbonate resins, polyolefin resins, acrylic resins and styrenic resins.

9. The optical film according to claim 8, wherein the thermoplastic resin is a cellulose acylate resin.

10. The optical film according to claim 9, wherein the cellulose acylate satisfies the following formulae (S-1) and (S-2):

$$2.0 \leq X+Y \leq 3.0 \quad \text{(S-1)}$$

$$0.25 \leq Y \leq 3.0 \quad \text{(S-2)}$$

wherein X means the degree of substitution with acetyl group of the hydroxyl group in the cellulose acylate, and Y means the degree of substitution with acyl group having at least 3 carbon atoms of the hydroxyl group in the cellulose acylate.

11. A method for producing an optical film comprising leading a melt of a composition containing a thermoplastic resin to pass between a first nip-pressing surface and a second nip-pressing surface of a nip-pressing unit, thereby continuously nip-pressing it therebetween to form a nip-pressed film, and stretching the nip-pressed film in the direction differing from the film traveling direction with holding both sides of the film, wherein the moving speed of the first nip-pressing surface is higher than the moving speed of the second nip-pressing surface and the stretching is attained at a temperature falling within a range of from (Tg−40)° C. to (Tg+5)° C. and wherein Tg means the glass transition temperature of the thermoplastic resin.

12. The method for producing an optical film according to claim 11, wherein the ratio of Re[0°] of the side of the nip-pressed film to Re[0°] of the center of the film falls within a range of from 0.5 to 0.99.

13. The method for producing an optical film according to claim 11, wherein a pressure of from 20 to 500 MPa is given to the melt by the nip-pressing unit.

14. The method for producing an optical film according to claim 11, wherein the ratio of the moving speed of the second nip-pressing surface to that of the first nip-pressing surface of the nip-pressing unit, as defined according to the following formula (IV), is from 0.60 to 0.99:

Moving speed ratio=(speed of second nip-pressing surface)/(speed of first nip-pressing surface)   (IV).

15. The method for producing an optical film according to claim 11, wherein the nip-pressed film is stretched in the direction of 90°±1° relative to the film traveling direction.

16. The method for producing an optical film according to claim 11, which includes preheating the nip-pressed film at (Tg−40)° C. to (Tg+3)° C.

17. An optical film produced by leading a melt of a composition containing a thermoplastic resin to pass between a first nip-pressing surface and a second nip-pressing surface of a nip-pressing unit, thereby continuously nip-pressing it therebetween to form a nip-pressed film, and stretching the nip-pressed film in the direction differing from the film traveling direction with holding both sides of the film, wherein the moving speed of the first nip-pressing surface is higher than the moving speed of the second nip-pressing surface and the stretching is attained at a temperature falling within a range of from (Tg−40)° C. to (Tg+5)° C. and wherein Tg means the glass transition temperature of the thermoplastic resin.

18. A polarizer comprising at least one optical film comprising a thermoplastic resin, wherein the optical film is such that the slow axis direction in the film plane differs from the film tilt direction and the birefringence of a sliced section of the film that contains the tilt direction and the thickness direction in the plane varies in the thickness direction of the film.

19. An optical compensatory film comprising at least one optical film comprising a thermoplastic resin, wherein the optical film is such that the slow axis direction in the film plane differs from the film tilt direction and the birefringence of a sliced section of the film that contains the tilt direction and the thickness direction in the plane varies in the thickness direction of the film.

20. A liquid crystal display device comprising at least one optical film comprising a thermoplastic resin, wherein the optical film is such that the slow axis direction in the film plane differs from the film tilt direction and the birefringence of a sliced section of the film that contains the tilt direction and the thickness direction in the plane varies in the thickness direction of the film.

* * * * *